(12) United States Patent
Hodge

(10) Patent No.: US 7,862,045 B2
(45) Date of Patent: *Jan. 4, 2011

(54) METHOD AND APPARATUS FOR DETERMINING AND RETRIEVING POSITIONAL INFORMATION

(76) Inventor: Bruce Hodge, 54 Wilton Rd., Greenfield, NY (US) 12833

(*) Notice: Subject to any disclaimer, the term of this patent is extended or adjusted under 35 U.S.C. 154(b) by 1282 days.

This patent is subject to a terminal disclaimer.

(21) Appl. No.: 11/402,419

(22) Filed: Apr. 11, 2006

(65) Prior Publication Data

US 2007/0035528 A1 Feb. 15, 2007

Related U.S. Application Data

(60) Provisional application No. 60/670,550, filed on Apr. 11, 2005, provisional application No. 60/760,750, filed on Jan. 20, 2006.

(51) Int. Cl.
*F41J 5/00* (2006.01)
*F41J 5/04* (2006.01)
(52) U.S. Cl. ..................................... 273/371
(58) Field of Classification Search ............... None
See application file for complete search history.

(56) References Cited

U.S. PATENT DOCUMENTS

| 3,727,069 A | 4/1973 | Crittenden, Jr. et al. |
| 5,516,113 A | 5/1996 | Hodge |
| 6,604,946 B2 * | 8/2003 | Oakes ..................... 434/11 |
| 7,207,566 B2 * | 4/2007 | Hodge ..................... 273/371 |

* cited by examiner

*Primary Examiner*—M. Sager
(74) *Attorney, Agent, or Firm*—Heslin Rothenberg Farley & Mesiti P.C.; Nicholas Mesiti, Esq.; Victor A. Cardona, Esq.

(57) ABSTRACT

An apparatus for determining and retrieving positional information including a surface having a plurality of first elements and a plurality of second elements, a first detection element connected to at least one of the plurality of first elements, and a second detection element connected to at least one of the plurality of second elements. The detection elements may include pulse detection elements or current sensing circuits. The plurality of first elements and the plurality of second elements may include conductive and non-conductive threads, and the conductive threads may include piezoelectric crystals embedded within conductive plastic.

19 Claims, 24 Drawing Sheets

TARGET SHIP WITH TOMAHAWK MISSILE

BURLAP CLOTH TARGET SHEET

TARGET SHIP 3D TRACKING SYSTEM

EXPLODED DIAGRAM OF THERMAL IMAGE COMPOSITE LAYERS

EXPLODED DIAGRAM OF SENSE SHEET LAYERS

PRESSURE SENSING CIRCUIT

SENSE SUIT TRACKING SYSTEM

LASER BASED TARGET SENSOR

LASER TARGET DETECTION BLOCK DIAGRAM

RTSL IMPLEMENTATION SCENARIO

RSTL INPUT COMPONENT BLOCK DIAGRAM

US 7,862,045 B2

METHOD AND APPARATUS FOR DETERMINING AND RETRIEVING POSITIONAL INFORMATION

CROSS-REFERENCE TO RELATED APPLICATIONS

This application claims the benefit of U.S. Nonprovisional patent application Ser. No. 11/054,670 entitled METHOD AND APPARATUS FOR DETERMINING AND RETRIEVING POSITIONAL INFORMATION, filed on Feb. 9, 2005, the disclosure of which is incorporated herein by reference in its entirety. This application claims the benefit of U.S. Provisional Patent Application No. 60/670,550 entitled METHOD AND APPARATUS FOR DETERMINING AND RETRIEVING POSITIONAL INFORMATION, filed on Apr. 11, 2005, the disclosure of which is incorporated herein by reference in its entirety. This application also claims the benefit of U.S. Provisional Patent Application No. 60/760,750 entitled METHOD AND APPARATUS FOR DETERMINING AND RETRIEVING POSITIONAL INFORMATION, filed on Jan. 20, 2006, the disclosure of which is incorporated herein by reference in its entirety. This application is related to U.S. Pat. No. 5,516,113, the entire contents of which are incorporated herein by reference.

COPYRIGHT NOTICE

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

TECHNICAL FIELD

The present application relates to methods and apparatuses for detecting positional location(s) of pressure, stress, or penetration and, more specifically, to an apparatus and a computer-implemented approach for detecting and retrieving positional information from surface or spatial plane.

BACKGROUND

Conventional shooting ranges use paper targets and lethal bullets to determine a shooter's proficiency in a very static and non-realistic environment. The methods and apparatus in this application allow shooters to (1) use non-lethal rubber bullets to test a shooter's proficiency or (2) train shooters in more real-life scenarios.

Stress analysis requires multiple strain gauges to be placed on a surface under test in each unique direction of interest. Using methods and apparatus of this application, stress can be measured in all directions using a simple omnidirectional strain gauge.

Target ships currently use video cameras to record missile impact and trajectory path as the missile travels through the target ship. The method and apparatus of the present application allows for an inexpensive way to instrument an entire target ship with location sensors, so that a missile can be tracked and displayed in real-time as the missile is traveling through a target ship.

Everyday, our soldiers are being hit by sniper fire and are having a hard time locating a sniper's location. If a simple apparatus could be built that would allow our soldiers to quickly locate snipers, then soldiers' lives would be saved. This patent application originates from the need to save our soldiers' lives, by providing them with an easy-to-deploy sniper locator.

SUMMARY

A method and an apparatus for determining and retrieving positional information is disclosed. One embodiment of the apparatus comprises a surface having at least two sides. A plurality of horizontal lines are formed on one side of the surface, the plurality of horizontal lines being parallel to one another and formed at least of conductive material. The plurality of horizontal lines are connected across a potential and a first break detection device and further connected to a first detection circuit. A plurality of vertical lines are formed on an opposite side of the surface, the plurality of vertical lines being parallel to one another and formed of at least conductive material. The plurality of vertical lines are connected across a potential and a second break detection device, and further connected to a second detection circuit. A data transport medium is operative to at least transmit data in one or both of the first detection circuit and/or the second detection circuit.

A method for determining and retrieving positional information in one embodiment comprises forming a first plurality of conductive lines parallel to one another on one side of a surface. A second plurality of conductive lines parallel to one another are formed on the opposite side of the surface, the first plurality being perpendicular to the second plurality. The first plurality of conductive lines are connected to a first sensing circuit and the second plurality of conductive lines are connected to a second sensing circuit. Data detected in the first sensing circuit and the second sensing circuit is transmitted to a processor.

Further features, as well as the structure and operation of various embodiments, are described in detail below with reference to the accompanying drawings. In the drawings, like reference numbers indicate identical or functionally similar elements.

DETAILED DESCRIPTION

Figures 1, 2:
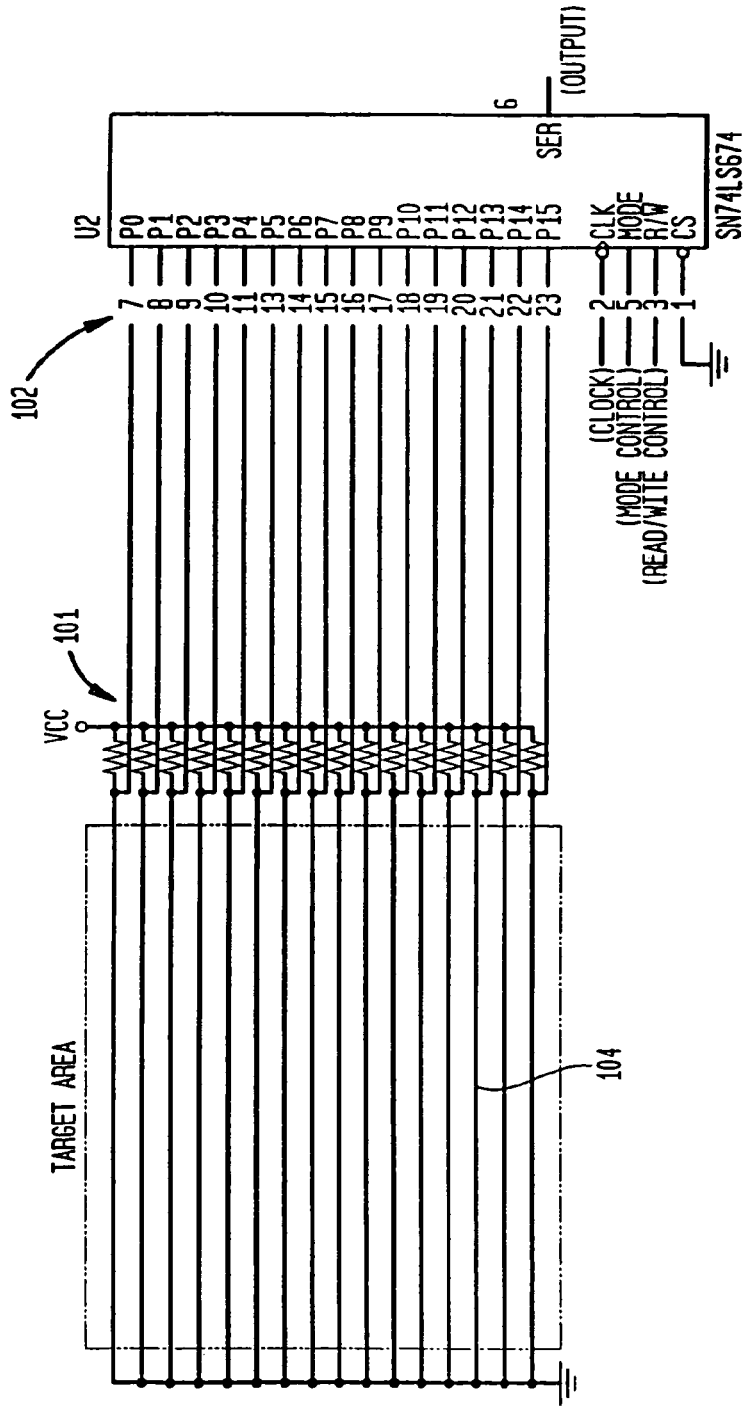
FIG. 1 is a circuit diagram depicting an approach for detecting breaks in conductive lines in one embodiment.
FIG. 2 is a diagram showing an embodiment of data encapsulation for a Digital Discrete Target (DDT)—Resistive Matrix Target (RMT) hybrid.

In one embodiment, the method and apparatus of determining and retrieving positional information may include a plurality of conductive lines formed on a single side of a plastic substrate, with a graphic colloidal suspension coating of conductive ink or conductive carbon nanotubes formed in one direction per side as shown in FIG. 1. The lines 104 formed on or bonded to the substrate may be purely conductive, for example, approximately zero ohms. When a projectile penetrates one of the conducting lines, it breaks the ground connection allowing the pull-up resistor 101 to bring the inputs for the lines penetrated from 0 volts to VCC or 5 volts 102. This penetration location detector locates which row(s) or X coordinate(s) were penetrated.

The row penetration detector shown in FIG. 1 may be rotated 90 degrees and placed on the other side of the substrate above, creating a matrix. This matrix or digital discrete target ("DDT") can detect both row and column (X/Y) penetrations. The digital discrete target ("DDT") is accurate for each unique pairs of rows and columns (X/Y) that are stimulated. Once a conductive line forming a row or column is broken, subsequent hits on that conductive line are non-detectable and other apparatus/methods are needed to accurately locate target penetration.

Figure 3:
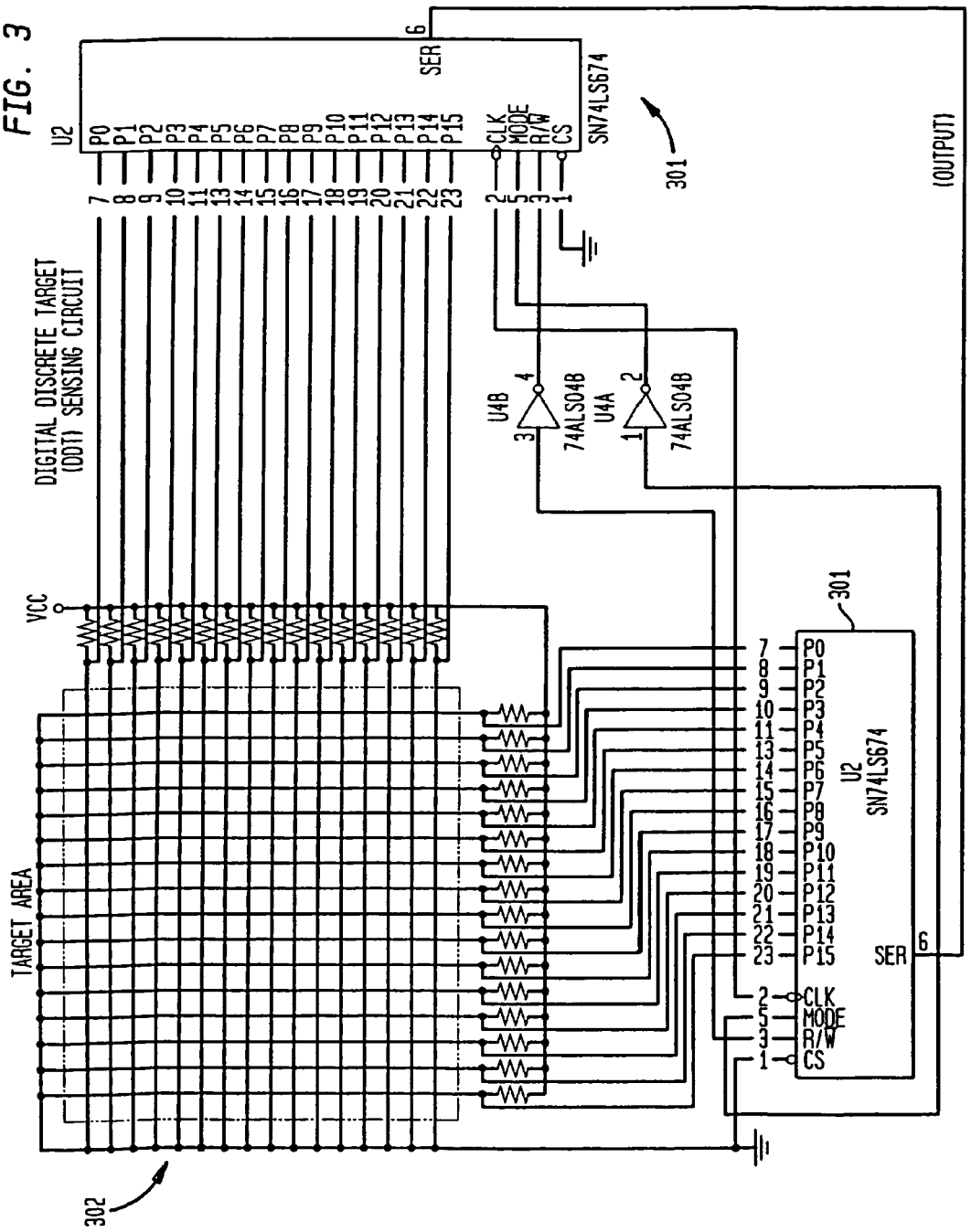
FIG. 3 is a circuit diagram depicting an approach for detecting breaks in both rows and columns of conductive lines of the DDT in one embodiment.

FIG. 3 shows the vertical and horizontal detection circuitry combined into a total X/Y penetration detection circuit. In one embodiment, the vertical lines are formed on the front of the target substrate with the sensing circuitry at the bottom, while the horizontal lines are formed on the back side of the substrate and have the sensing circuitry on the right. The sensing circuit on the right could be located at the bottom by routing the horizontal lines down the right side using colloidal suspension coating or conductive ink, thus keeping the detection circuitry out of harm's way. A person of ordinary skill in the art will appreciate that the actual locations of the sensing circuits may be altered as desired.

Other DDT sheets could be laminated at other than 90 degrees to add even more accuracy to the system. A 45 degree sheet may provide a diagonal indication of penetration, etc. Detection circuits such as a shift register 301 are connected to the horizontal and vertical lines 302, respectively. In one embodiment, both shift registers 301 may combine their data into a single stream and send it, for instance, via a data transport medium, to the remote or onboard computer for processing. For instance, the data from the shift registers may be in a digital word format comprising a plurality of bits. Each bit would represent X-Y position coordinate of the DDT. The data streaming out of both penetration location detectors of the DDT would be sent to a data transport medium. A data transport medium, for example, may be connected to the shift registers 301, and is, for example, any device or protocol used to transfer data from one entity to another. Some examples of the data transport medium include, but are not limited to, wireless transmitter, 802.11 protocol on category 5 cable, FSK encoded transmitter, a cellular transport system, etc.

If multiple DDTs are used in the same area, a unique identification tag can be embedded in the digital data stream to identify which DDT transmitted the data. The resolution of the target would be determined by the spacing of the grid formed by the conductive lines. The target could have an onboard computer that would hold the previous state of the digital data in memory and continuously compare it with the incoming digital data stream from the DDT. Then only send the X/Y coordinate of a projectile penetration when activity occurs on any of the lines causing a difference between what is stored in memory and what is streaming out of the DDT.

The DDT of the present application may be used in conjunction with other apparatuses. For instance, resistive matrix target ("RMT") disclosed in U.S. Pat. No. 5,514,113 may be utilized with the DDT. If DDT was bonded or laminated to RMT to form a composite membrane target, DDT would provide a means to significantly reduce the number of permutations needed to isolate target penetration. Briefly, RMT is a resistive matrix target formed from colloidal suspension of resistive ink on one side of a substrate. The DDT would be bonded to the other side of the substrate insulating it from the RMT circuitry. In one embodiment of RMT, positional penetration information is determined by using Successive Approximation Simulations ("SAS"), a mathematical modeling technique. Each simulation processes a large number of simultaneous equations, so the less simulations to perform, the faster the data acquisition becomes.

By aligning the node locations in the RMT to the X/Y intersections of the DDT, the successive approximation simulation (SAS) algorithm can rapidly isolate the target penetration location. Knowing what nodes to simulate in the SAS algorithm is extremely useful, especially in handling simultaneous penetrations. It significantly limits the field of search or permutations generated. In one embodiment of the DDT, once a line has been broken, it will remain that way for the duration of the target's life. In one embodiment, the DDT-RMT hybrid data sent to the main or onboard computer could have horizontal and vertical data from the DDT 203 multiplexed with the RMT data 202 and tagged with a unique id 201 as shown in FIG. 2.

Figure 6:
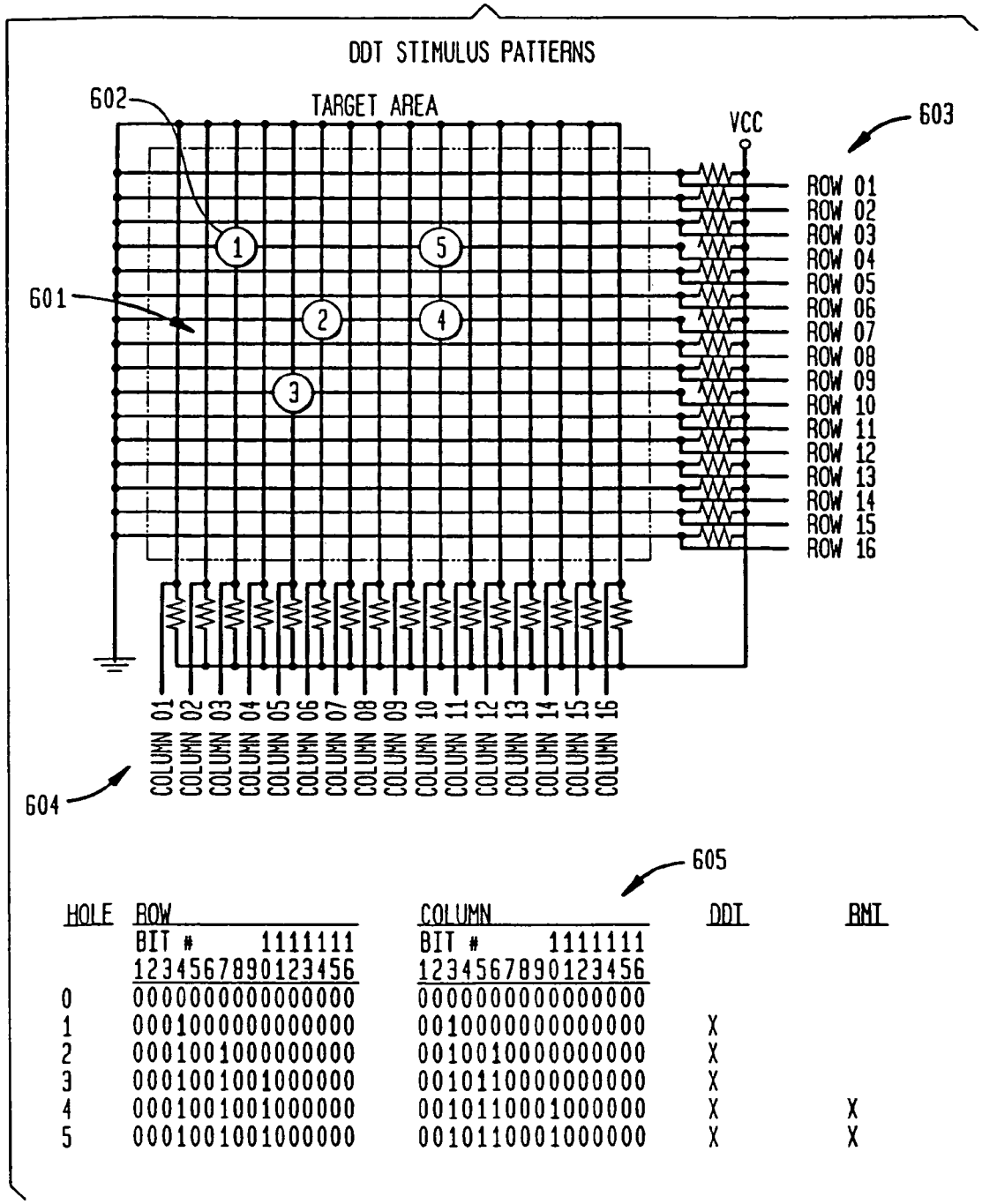
FIG. 6 is a circuit diagram of a DDT with nodes removed and their corresponding logic table in one embodiment.

FIG. 6 shows a set of target penetration scenarios 602 on the DDT circuit diagram 601, along with the DDT digital logic table 605. Each column of bits in the logic table's Row field represents the output of each DDT Row 603. Each column of bits in the logic table's Column field represents the output of each DDT Column 604. A new target has all bits set to zero because the conductive lines pull down each and every input, as shown in Hole (0) of the logic table 605. When the target is hit for the first time, its penetration location can be found directly without having to use the RMT data and SAS processing time as shown in Hole (1). The DDT X/Y location would tell exactly where that first hit occurred immediately. The DDT field in the logic table 605 has an X indicating that only the DDT data processing is required to locate the target penetration. After the first hit, there is a potential that an already previous line of the DDT that was broken was hit again at a different location. The DDT information is still useful because it significantly limits the amount of simulations required to reduce the data by restricting the area of search to only 'DDT possible' intersection locations. Hole (1) through Hole (3) each generate a unique pair of Row and Column stimulus and, therefore, only require DDT data processing to locate target penetration. When Hole (4) penetrates the DDT, only a Column (10) is stimulated because there is no change in any of the Row(s) state.

This, for example, is where the DDT-RMT hybrid is useful in locating Hole (4), as indicated by a 1 in only the Column 10 bit position and the X in both DDT and RMT fields of the logic table 605. The node id (identifier) of the RMT is calculated by counting nodes (intersections) from left to right, top to bottom. In FIG. 6, the laminated RMT layer is perfectly aligned with DDT matrix so an RMT node id can be calculated by RMT_ID=(DDT_Row−1)*16+(DDT_Column−1). RMT nodes map directly to DDT intersections and can be referred to interchangeably. RMT nodes are referred to by a zero based unique id, whereas DDT intersections are referred to by 1 based (Row, Column) designators.

Figure 4:
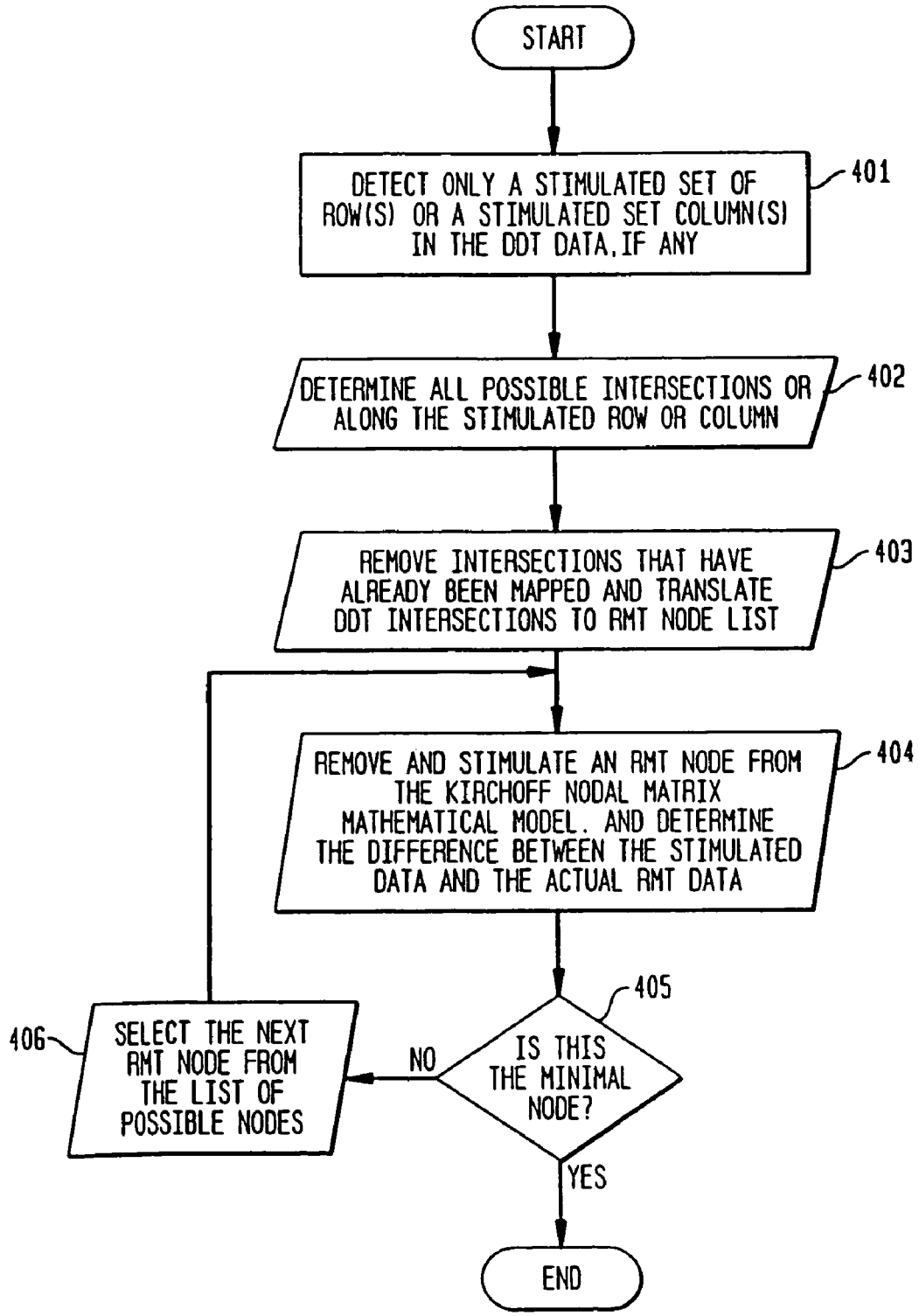
FIG. 4 is a flow diagram depicting the nodal reduction algorithm for the DDT-RMT hybrid in one embodiment.

FIG. 4 shows a flowchart of the algorithm used to reduce the DDT-RMT data. The computer reducing the multiplexed data packets of the DDT-RMT shown in FIG. 2 would first detect only a change in the DDT's Column (10) data bit and not change in the DDT's Row data 401. Then, the computer would look at the bits set to 1 in the Row data (0001001001000000). A list of possible intersections 402 would be at Rows 4, 7, and 10. By combining the stimulated Column (10) with each 1 bit in the Row data intersections (Row 4, Column 10) or RMT node id 57, (Row 7, Column 10) or RMT node id 105, and (Row 10, Column 10) or RMT node id 153 are permutated. In this case, there are no intersections to remove 403 because a DDT column was stimulated and removed the ambiguity of the Column or Y axis. It is known that it is RMT node 57, 105 or 153. This also means that a method in one embodiment can locate the target penetration by performing only 3 simulations. The DDT intersections are, however, converted into RMT node ids for further processing. Next, the method in one embodiment removes an RMT node located at a DDT intersection from the mathematical model and simulates 404. The voltages coming back from the simulator's sense nodes are compared to the actual voltages returned from RMT sense nodes and a decision is made as to if this is the minimal node 405.

In one embodiment, that could entail storing all previous node ids, along with the sum or absolute sum of the delta differences in voltages between the simulated and actual RMT data. When the permutated list has been exhausted, the minimal node id would be looked up using a standard linear search algorithm. Another embodiment might set a minimum sum or absolute sum of delta voltages threshold value. Once that minimal threshold was crossed, the current node would be considered the minimal node. If the node is not the minimal node, the next node is selected from the list of possible intersections 406 and control is passed back to the simulator for processing (as shown in FIG. 4). The minimal node id would be the node id of the actual target penetration in the RMT target. The penetration location would correlate to the same intersection of the laminated DDT target and, in the case of FIG. 6, Hole (4) would be RMT node id 105 or DDT (Row 7, Column 10).

Hole (5) does not stimulate the DDT because both Row and Column lines were previously broken and remain in the same state. The logic chart 605 shows that both Row and Column data remain static and an X in both the DDT and the RMT field indicating that DDT data, RMT data, and SAS processing are to be performed. The RMT data changes because of the shift in currents of the resistive matrix triggering the transmission of data packets.

FIG. 4 again shows processing of the data using the DDT-RMT hybrid target. Since there was no stimulated DDT Row or Column, all possible permutations are generated 402. In the case of FIG. 6, they are all possible permutations of Rows 4, 7, 10 and Columns 3, 5, 6, and 10. In X/Y pairs, they are (4,3), (4,5), (4,6), (4,10), (7,3), (7,5), (7,6), (7,10), (10,3), (10,5), (10,6), (10,10). From that list, X/Y pairs (4,3), (7,6), (10,5), (7,10) are removed 403 because they have already been mapped as being previously penetrated—leaving (X/Y) Pairs (4,5), (4,6), (4,10), (7,3), (7,5), (10,3), (10,6), (10,10) in the list of intersections to be processed or possible simulation to be performed. The intersections are converted into RMT node ids. A node from the list is removed from the mathematical model and simulated 404; then it is determined if it is a minimal node 405. If not the next node in the list is selected 406 to be removed from the mathematical model. The selection method to determine the next node from the list could be simply selecting the next node in the list or it could be calculated using geometric progression or vector based mathematics. Control is passed to the simulator as shown in FIG. 4 until the minimal node is located. In the case of FIG. 6, it would be DDT (Row 4, Column 10) or RMT node id 57. The minimal node location designates the location of penetration. This data would be used to position a dot on a computer screen mapped to the exact location where the penetration occurred on the remote target in real-time. This would be useful in determining scoring without have to use optical analysis or target retrieval/visual inspection techniques. It also allows one to store shot data for post-analysis, gun calibration, internet shooting competition, etc.

In another embodiment, node resistors may be successively removed from the normalized Kirchoff nodal matrix in a repetitive sweeping geometric progressive pattern. Once the closest approximation of the affected area of the actual target data is determined, the simulator would change modes to a more finite graphing algorithm and pinpoint the actual resistors removed from the matrix (within close proximity to that pre-determined area) as described below.

Figure 5:
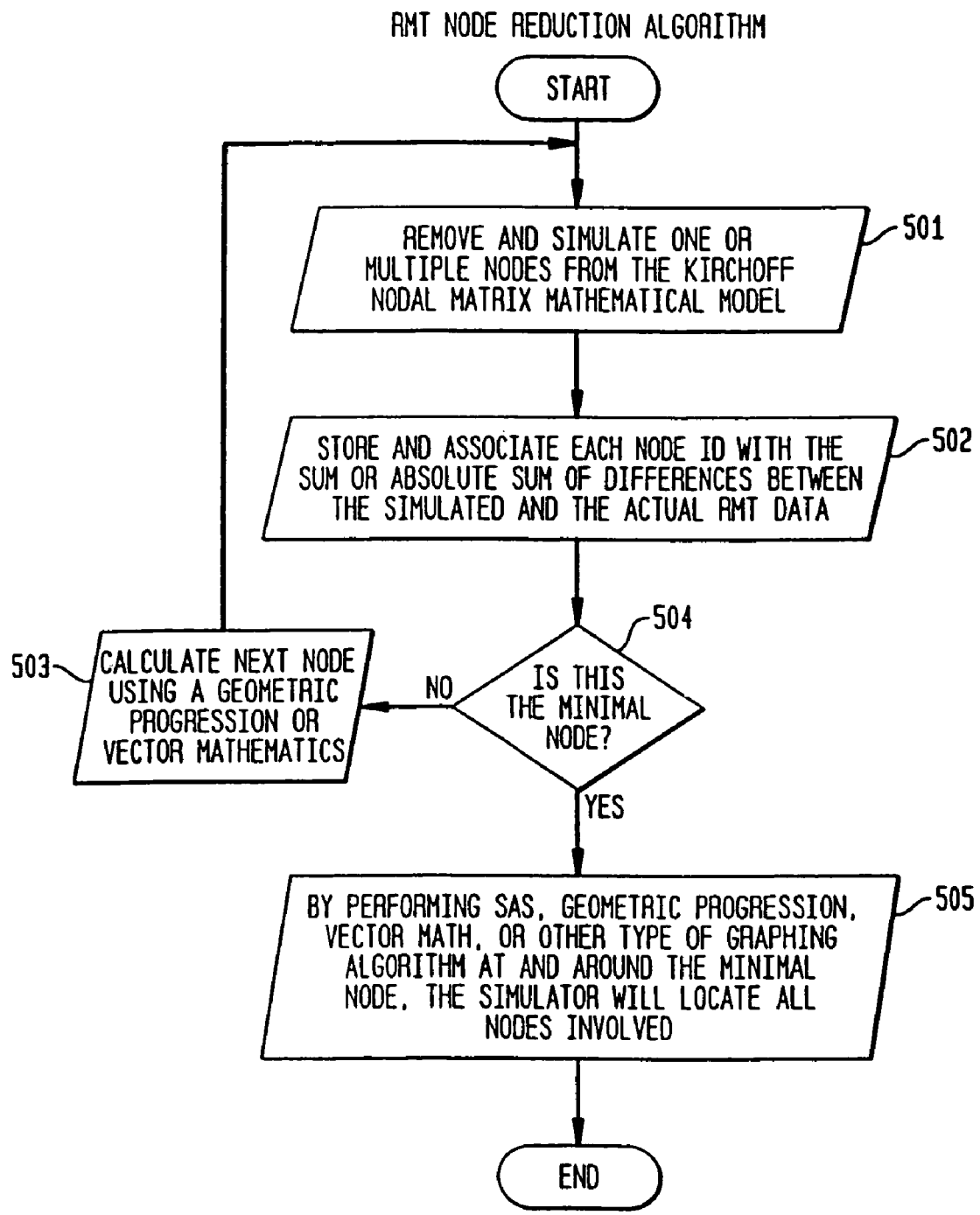
FIG. 5 is a flow diagram depicting the Successive Approximation Simulation (SAS) reduction algorithm for minimal node(s) in one embodiment.

FIG. 5 shows an embodiment of the algorithm used to reduce the time it would take to locate the penetration positional location of RMT data. This algorithm in one embodiment is a fundamental basis of nodal analysis between the simulator and the RMT data in the reduction and isolation of affected nodes. It is SAS at the node level. In one embodiment, a group of nodes forming a geometric pattern like a triangle are chosen to start the analysis. Each node in the nodal group are removed one at a time and simulated from the mathematical model 501. The sum of the absolute or real difference between the simulated sense node voltages and the RMT sense node voltages or delta difference are stored and associated with the node id being processed 502. A determination is made as to whether the minimal delta difference node has been found at 504. If not, the minimal node is located by repetitively simulating multiple nodes in a geometric progression or using vector math at 503 to predict the most likely candidate for the next simulation.

In one embodiment, determining the minimal node 504 could entail storing all previous node ids, along with the sum or absolute sum of the delta differences in voltages between the simulated and actual RMT data. When the permutated list has been exhausted, the minimal node id would be looked up using a standard linear search algorithm. Another embodiment might set a minimum sum or absolute sum of delta voltages threshold value. Once that minimal threshold was crossed, the current node would be considered the minimal node. Once the minimal delta difference node has been determined, a process which uses SAS, geometric progressions, vector math, or other type of graphing algorithms can locate all nodes involved 505.

An example of a geometric progression would be to simulate 4 nodes in a square or 3 in a triangular pattern and locate the minimal node, then center on that node, reduce the geometric progression nodal spacing, and repeat the process again until the minimum delta difference node(s) are located. For example, using vector base math, the 3 points of the triangle delta differences would be used to create a vector map. Points chosen would have their sum of delta values stored, along with their position on the matrix. Points having a larger sum of voltage differences would be considered farther away from the actual point of penetration, while points with small sum of voltage differences would be considered closer to the point of penetration. Using 3 points on a plane with the sum of the voltages of each point as its magnitude, a resultant vector could be calculated using triangulation mathematics. The resultant vector origin would be the centroid of the next triangular nodal grouping or might even be the minimal node directly. By reducing the spacing between the nodes for each geometric progression, the method in one embodiment hones in on the exact location of penetration quickly.

Generally, the method in one embodiment locates the RMT penetration through a series of educated/calculated guesses using a mathematical model of the real-world resistive matrix target. Then, through a series of simulations and the help of standard vector or geometric progression mathematics, locate the penetration point in the simulator which is the closest approximation to the real-world. A good analogy is to make a volt meter by ramping a digital counter into a D/A converter, while taking the analog output of the D/A converter and feeding it into one side of a comparator. The other side of the comparator is tied to the signal from the real-world that is to be measured. When the comparator changes state, the counter is stopped and the counter data can be read directly. It will contain the digital value which, when converted to its analog value, represents the voltage from the real-world as specified in the D/A converter specs. For example. An 8 bit D/A with a 0-5 volt range has a least significant bit weight of 0.0196 volts. So if the counter stops at count of 128 then the real-world stimuli is 128*0.0196 or 2.51 volts.

In another embodiment, LU decomposition or Chebyshev approximation may be used for solving the resistive matrix nodal equations, instead of using Gauss-Jordan method (as shown in U.S. Pat. No. 5,516,113). Any simultaneous equation solving function that can efficiently process a tri-diagonal banded symmetrical matrix will work. Also, instead of using nodal analysis, one may use mesh analysis to solve the resistive matrix equations. Since the matrix is composed of a finite set of linear equations, using standard linear algebra mathematics should be able to solve it. In one embodiment, the grid could be broken into smaller quadrants, thereby reducing the amount of area needed for simulation.

Figure 8:
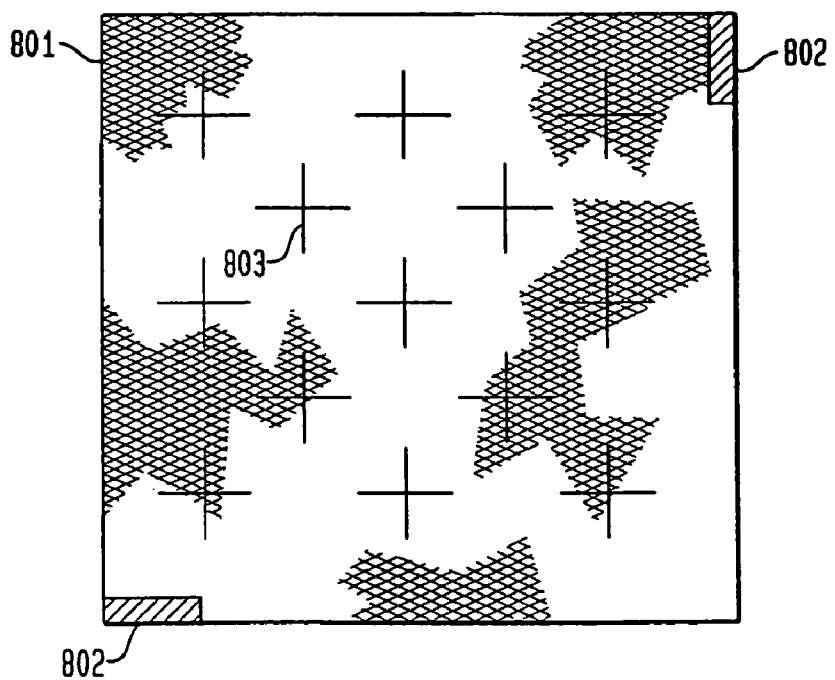
FIG. 8 is a picture of a burlap cloth with break detection wires weaved through it in one embodiment.

Another embodiment of determining and retrieving positional information uses burlap bag cloth 801 with small wires weaved into them 803, creating a pliable target sheet (as show in FIG. 8). Each target sheet has a similar circuit (shown in FIG. 3) attached with a data acquisition circuit and wireless transmitter using a unique frequency and/or having a unique identification tag inserted into the data stream 802. By spraying adhesive glue to a target ship's bulkheads, ceilings, and flooring and adhering target sheets to each surface, a collection of target planes can be formed by the target sheets. Each target sheet, in one embodiment, has a unique location within the ship and has a unique identification tag associated with it. Only one side of each bulkhead, ceiling, or floor needs to be instrumented with a target sheet. Each target sheet may represent a surface of the ship and each vertical and horizontal wire intersection of the target sheet represents a positional location within that surface. The resolution of accuracy would depend on the distance between the rows and columns of wires 803 embedded in the target sheet. Once in place, an exact computer model of the target ship may be rendered using the planes formed by the target sheets and identified by each unique id. After being instrumented with target sheets, a remote data collection boat may be placed within reception range of the target ship 701 and testing can begin.

Figure 7:
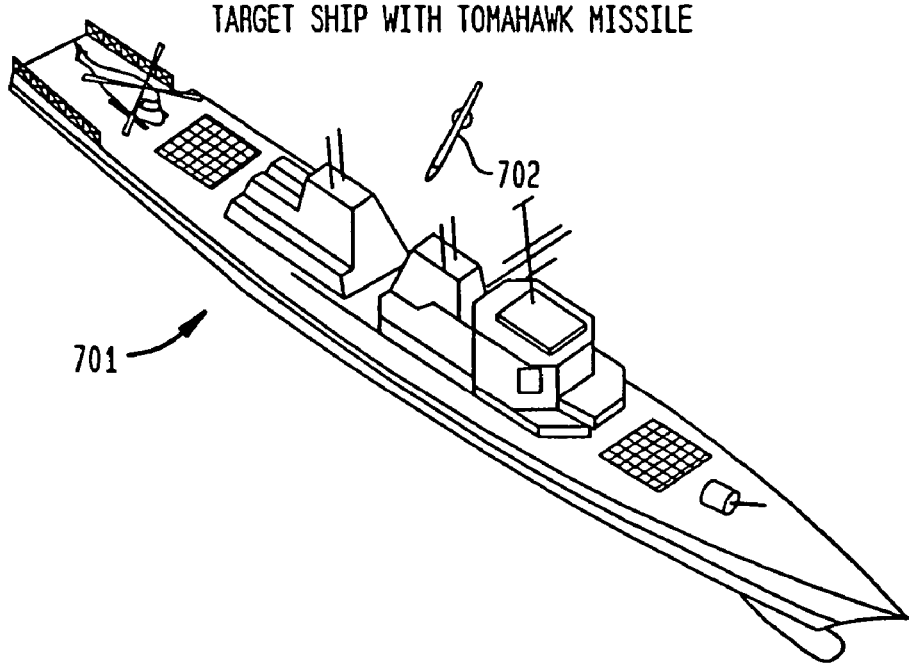
FIG. 7 is a computer model depicting a target ship with a harpoon missile about to make contact in one embodiment.

FIG. 7 shows a scenario where a target ship has been instrumented with target sheets and a harpoon missile is about to penetrate the target ship. When the harpoon missile 702 impacts the target ship, its entry point and penetration path would be displayed on a transparent 3D computer simulated model of the target ship in real-time. Each target sheet would have a battery powered transmitter(s) that would send its X/Y penetration information only if it was penetrated, thereby reducing the amount of data that needs to be recorded and redundant transmitters 802 could be used to increase fault tolerance. In another embodiment, the data from each target sheet could be routed through the target ship by a series of redundant cables and brought to a pair of transmitters on the top of the ship for transmission. Each data packet sent from each target would be tagged with that target sheet's id and a transport medium such as 802.11 protocol running on category 5 cable could be used to bring the data to the transmitters. The damage assessment could be done in real-time as the missile is traveling through the ship. Each surface would display activity as it is happening.

Figure 9:
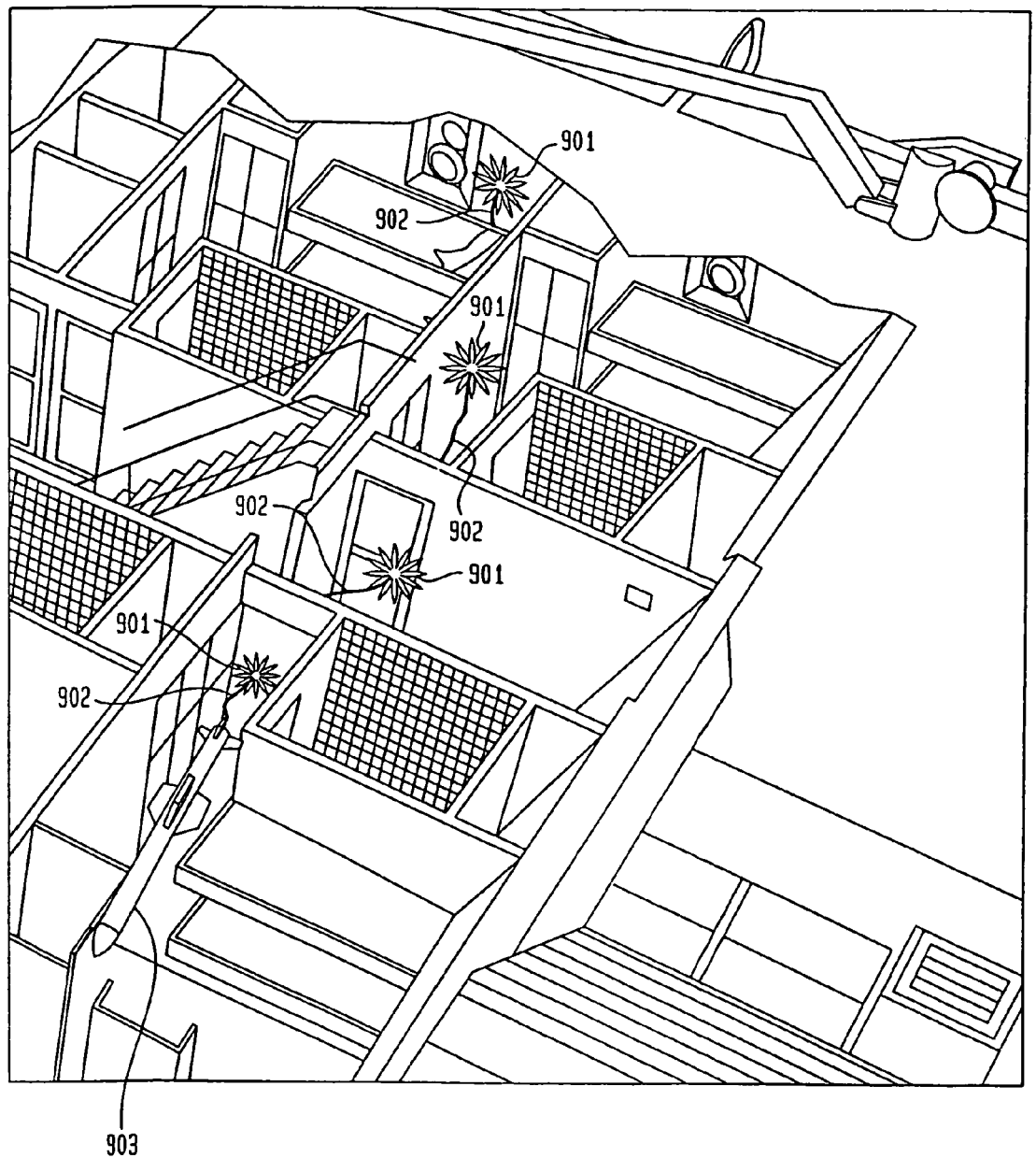
FIG. 9 is a 3D computer model depicting a missile tracking system, displaying the trajectory path of a missile as it is penetrating a target ship in one embodiment.
Figure 10:
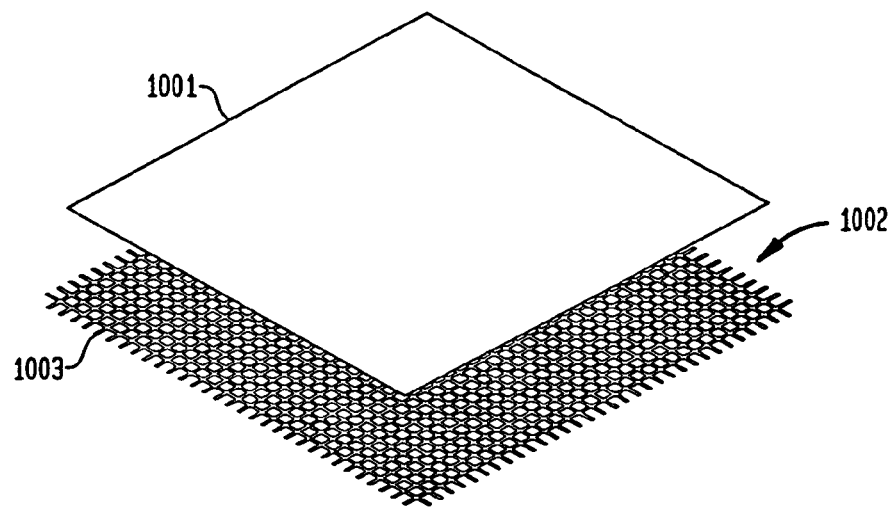
FIG. 10 is an exploded diagram of a thermal signature generator showing the thermally conductive layer, the plastic substrate, and the resistive heating layer in one embodiment.

FIG. 9 shows an embodiment of the tracking system used to monitor the activity of the missile 903 as it is penetrating the ship. Each surface area, instrumented with a target sheet that is penetrated by the missile, is mapped by the computer and the centroid of its X/Y penetration point 901 is calculated in real-time, then plotted and displayed on the tracking system 3D ship model. This is done by measuring the time it takes the missile to penetrate one surface to the next and combining the time duration with the penetration locations within each surface. Using vector math, the magnitude, velocity, and direction of the missile's trajectory path 902 can be determined and plotted on a 3D computer model. All the data from the missile test can be stored and used to feed simulation models during post-analysis.

Surface-to-air missiles (SAM) and other types of missiles, like air-to-air missiles, are used on flying target tow bodies or drones to assess the accuracy of the missile. A target tow body is a flying target vehicle that is towed behind an airplane by cable. Currently, it is a hit or miss scenario when testing missiles. A flying target tow body or drone used for testing of missiles could use the same technology (as shown in FIG. 3) to detect and assess a near-miss penetration. In this embodiment, an adhesive may be used to adhere the thin plastic membrane of DDT or RMT to the target vehicle and route sense wires into the vehicle to the data acquisition system. All the data would be sent to a ground station using PCM-encoded data or other standard telemetry techniques. When a missile detonates close to the vehicle and is hit by fragments, the fragment penetration location(s) would be detected and relayed down to the ground station for real-time analysis.

In one embodiment, the targets could be bonded or laminated with a sheet of thermally-conductive membrane/substrate to form a composite target. One that detects penetration while radiating a thermal image for night fire training. This substrate would be electrically insulated on the side that is laminated to the DDT or RMT and have a resistive colloidal suspension coating or resistive ink with thermally conductive additives in a matrix pattern. The matrix is heated up by placing a large potential across the matrix similar to the potential shown in FIG. 13. When current flows through the resistive ink, the temperature would increase in the ink lines combined with the thermally-conductive additives would assist in distributing the heat evenly. This may be used to generate an evenly distributed thermal signature or image for night fire training and could be applied to all kinds of targets. The DDT or RMT target sheet would indicate the target penetration, while the thermal layer maintains a consistent thermal image.

In another embodiment, the method and apparatus may include coating one side of the thin plastic substrate 1002 with a thermally conductive colloidal suspension coating 1001 and the other side with a graphic colloidal suspension coating of resistive ink in a matrix pattern 1003. The thin plastic substrate 1002, for example, is a sheet of plastic. It works as follows in one embodiment: the resistive matrix 1003 is heated up by placing a large potential across the resistive matrix 1003 in a similar manner to the potential shown in FIG. 13 designated, for example, by the (+) and (−) signs indicating polarity. The current flowing through the resistive matrix causes it to heat up. That heat is transferred through the plastic substrate and onto the top thermally conductive coating where it is evenly distributed by the thermally conductive coating. This thermal signature layer when bonded to a DDT or RMT would be used to generate a consistent thermal image. Programmable constant current sources and/or thermal couple feedback may ensure that the thermal image maintains proper temperature relevant to its current ambient temperature.

Figure 11:
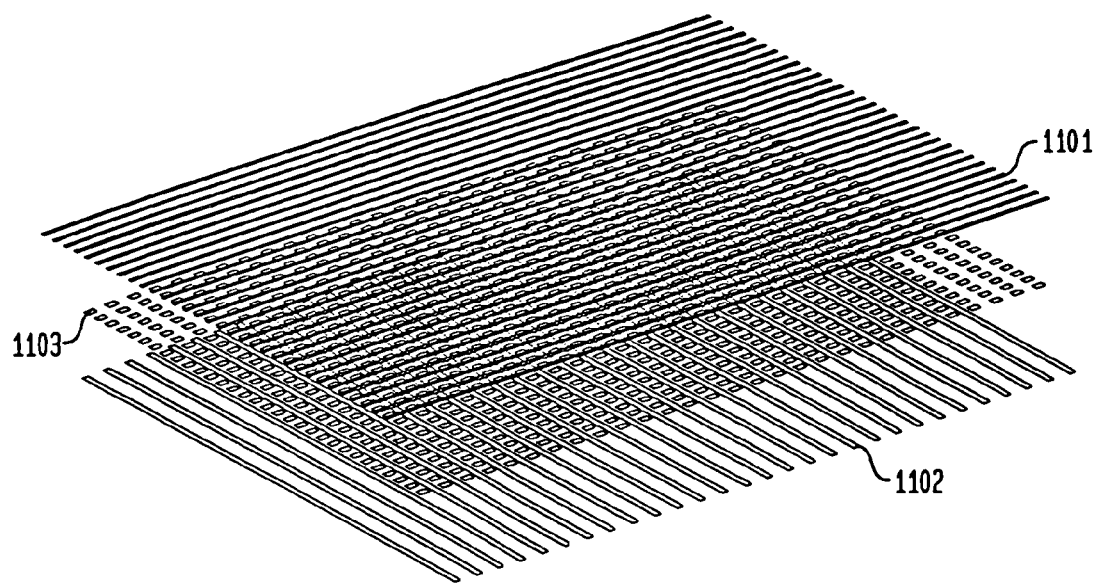
FIG. 11 is an exploded diagram of an embodiment showing the conductive ink traces with pressure sensitive conductors between them for pressure sensitive sense sheets in one embodiment.

Another embodiment of determining and retrieving positional information comprises two separate sheets of plastic substrate, each having a graphic colloidal suspension coating of conductive ink lines formed in one direction on one side. FIG. 11 shows taking one of the sheets, flipping it over and rotating 90 degrees 1101 so that the conductive lines are facing each other and are perpendicular to each other 1102. Then, a discrete pressure sensitive switch type material of conductive foam rubber, bubble switch membrane, or carbon impregnated rubber/silicon may be placed at each intersection 1103 and laminated together. This would form a pressure sensitive sheet or sense sheet target that could be used to detect an impact at any intersection(s). When pressure is applied at any intersection(s), the resistance between the X (Row) and Y (Column) would go from open circuit to a short circuit. In the carbon impregnated rubber, the carbon molecules would go into compression causing the carbon molecules to come in contact with adjacent carbon molecules causing the resistance to decrease with pressure. A thin membrane device like a bubble switch could also be used. When the membrane is put under pressure, it changes state from an open circuit to a closed circuit. The medium of this invention is shown by way of example and is not limited to those examples.

Figure 12:
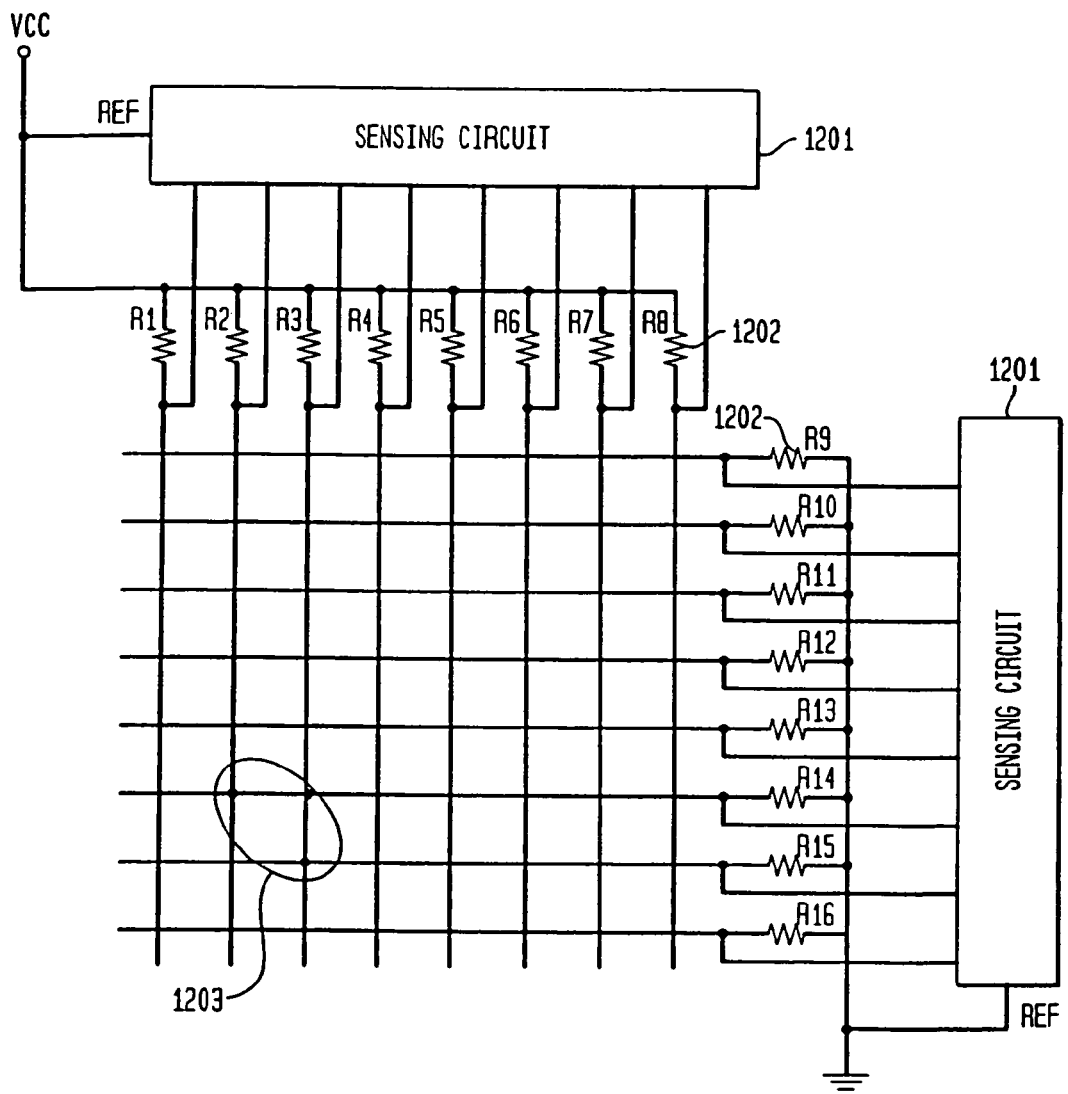
FIG. 12 is a circuit diagram depicting an approach for a current sensing circuit used to locate sense wires of sense sheets, or sense suits in one embodiment.

A circuit shown in FIG. 12 may be used to detect those currents and retrieve the X/Y positional information. When pressure is applied 1203, the sense resistors 1202 located at the affected X/Y position(s) start drawing current, causing a change in voltage across the sense resistors. The current sensor circuits 1201 detect that change and transmit the data to a data acquisition circuit for processing and transmission. Current sensing circuit may be, but is not limited to, current sense amplifiers, op amps, high-side current monitors, latches, or shift registers.

The Sense Sheet Technology (SST) described in the present application may be applied to targets to detect an impact from a paintball, rubber T-ball, or Simunition® rubber bullet, golf club faces to determine ball impact point, golf courses to detect ball impact and roll path, touch screens to locate finger impact, dentist office to measure and digitally mark tooth high spots, manufacturing where more than one material comes in contact with another to assist in alignment or proper bonding pressures, shoes to measure load bearing pressure points, and sports equipment for impact location such as batting cages, tennis courts, etc.

In another embodiment, stress directional information is possible. Stress analysis in every direction on virtually any surface may be accomplished by replacing the resistive ink of RMT with a compound that changes resistance with stress (like a strain gauge). Current strain gauge technologies allow stress to be measured in only one direction. By adhering a stress sensitive or strain gauge to a surface, stress can be measured in direction of interest. If more than one direction of stress measurement is desired, then multiple strain gauges have to be used and oriented in the desired direction of stress.

Figure 13:
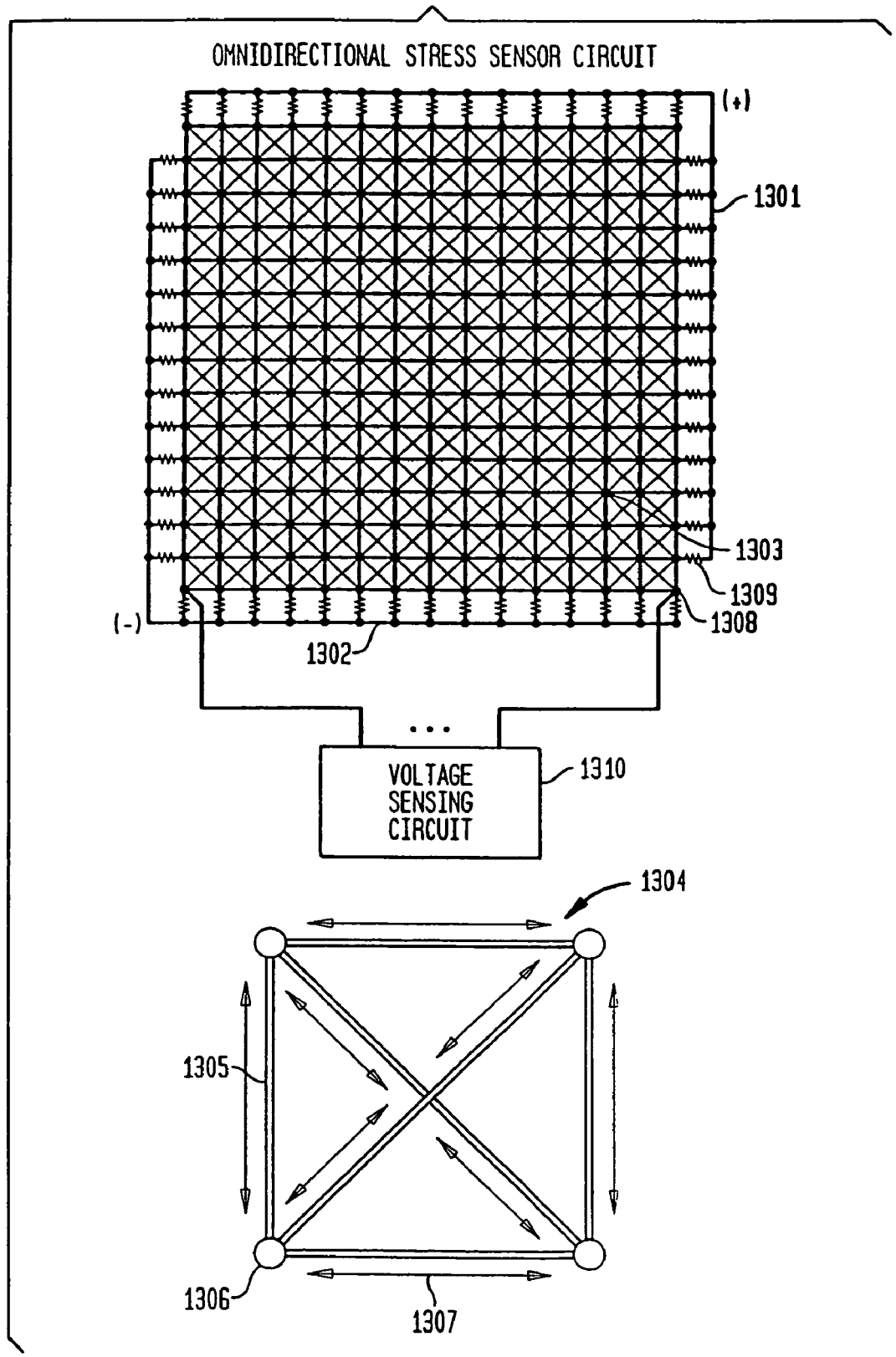
FIG. 13 is a diagram depicting an omnidirectional strain gauge trace patterns in one embodiment.
Figure 14:
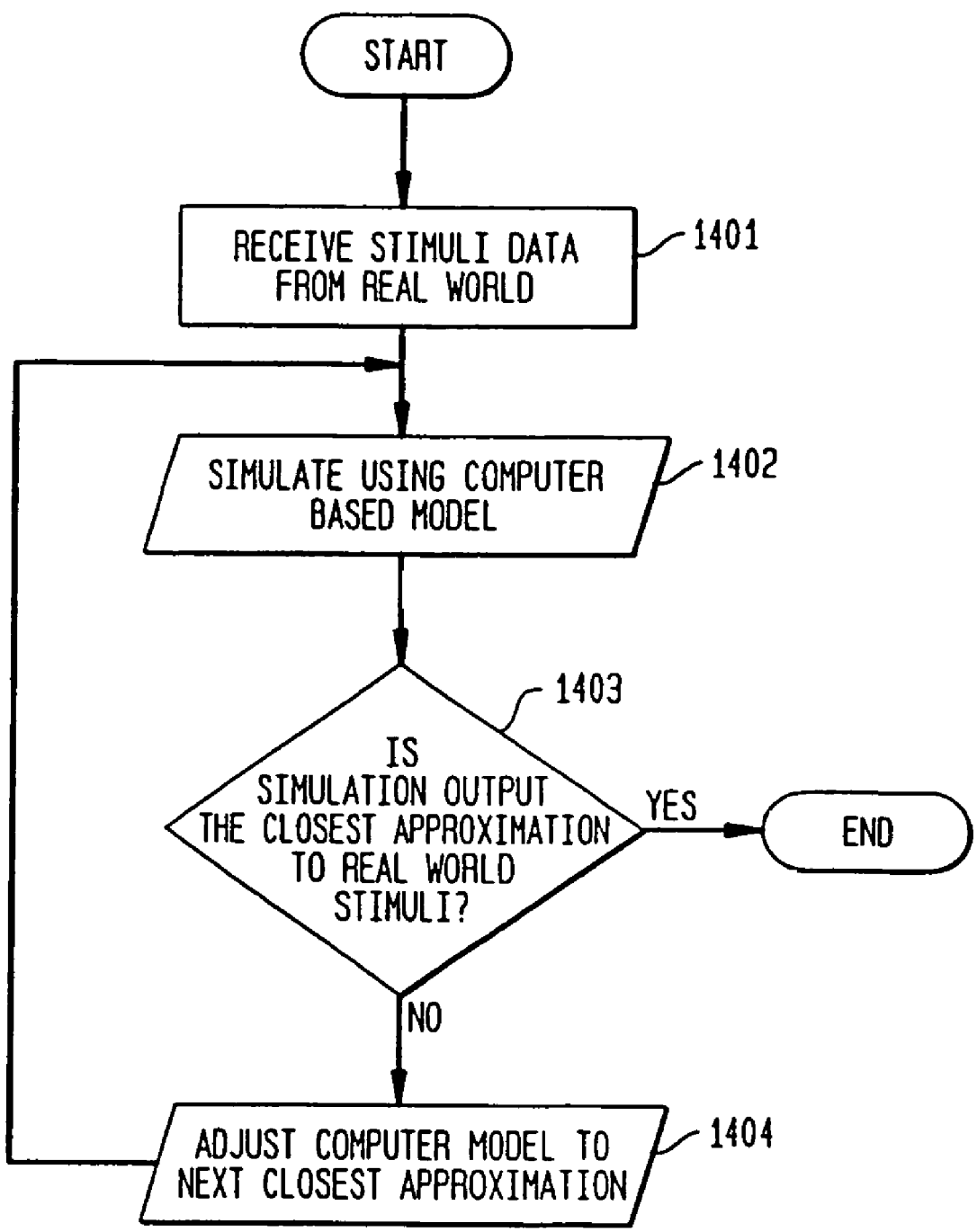
FIG. 14 is a flow diagram depicting the Successive Approximation Simulation (SAS) algorithm in one embodiment.

In one embodiment, omnidirectional stress measurement may be done by using molecular nanotechnology or similar molecular manufacturing technologies to produce a crystalline or piezoelectric crystalline colloidal suspension coating as a base for this new application of RMT. Instead of using the grid shown on U.S. Pat. No. 5,516,113, the present application may use multiple omnidirectional stress cells whose triangular patterns are shown in FIG. 13. A single omnidirectional stress cell would contain one square with the X pattern inside 1304, for example, forming a lattice matrix. Each line of stress sensitive ink 1305 (for example, crystalline colloidal suspension coating and/or piezoelectric nano-tubes) changes resistance proportional to the amount of stress being applied to it along its line of direction. The voltages measured at the end nodes 1306 would vary proportionally to the change in the resistance, directly correlated to the amount of stress being applied to the cell. Lines of stress 1307 either put the crystalline resistive ink into compression causing the resistance to decrease or expansion causing the resistance to increase.

FIG. 13 is an example of a lattice matrix of multiple omnidirectional stress cells 1303. This crystalline stress sensitive ink may be bonded to a thin plastic substrate with an adhesive backing and applied to virtually any surface that needs stress analysis. It works, for example, by applying a positive voltage 1301 to two adjacent sides and a negative voltage 1302 the other two adjacent sides as shown on FIG. 13. The voltage at each sense node 1308 contains a voltage that is proportional to the current through each sense resistor 1309 and, for example, in one embodiment can be digitized with a high speed A/D converter or voltage sensing circuit 1310, then transmitted, for example, wirelessly to a remote computer for analysis. The sensing circuit 1310 may be connected to all sense nodes surrounding the lattice matrix. The data may be reduced using RMT "Successive Approximation Simulation" (SAS) method. This method and apparatus may be useful in measuring stress in airplanes, cars, boats, trains, and anywhere omnidirectional stress measurements are needed.

The algorithm described in U.S. Pat. No. 5,516,113, entitled "Computer Target Analysis Flow Chart," is known as "Successive Approximation Simulation" (SAS). A real world stimulus 1401 is compared to a computer simulation 1402 in successive steps, each step involving a change in the simulation model 1404 and a re-simulation to determine if the simulation output is the closest approximation 1403 of the real-world stimuli. When the delta differences between the real-world stimuli and the simulation output are at a minimum, the simulation has modeled the real-world stimuli to the best of its ability. SAS can be used to solve very complex problems in the real-world (beyond targets). For example, in the biomedical field, SAS may be used to correctly isolate genes in an enzyme by simulating with different DNA chains until the simulation results most closely match that of the enzyme under study. More exactly, one could measure the enzyme PH factor and use that as the stimulus for the computer model. Then, by modifying the proteins or amino acids in the DNA chain of the computer enzyme model and monitoring the PH level of the model, SAS could determine the closest approximation of the enzyme. Basically, the closest approximation configuration of amino acids in the computer model would determine the actual sequence of amino acids in the real-world enzyme. One could also use SAS to simulate the stress sensor data that came back from a space shuttle wing when hit by debris and get a close approximation as to what real damage has occurred. One could use the stress analysis implementation shown in FIG. 13 and described above to possibly prevent a potentially catastrophic failure due to excessive stress in a critical structure.

Figure 15:
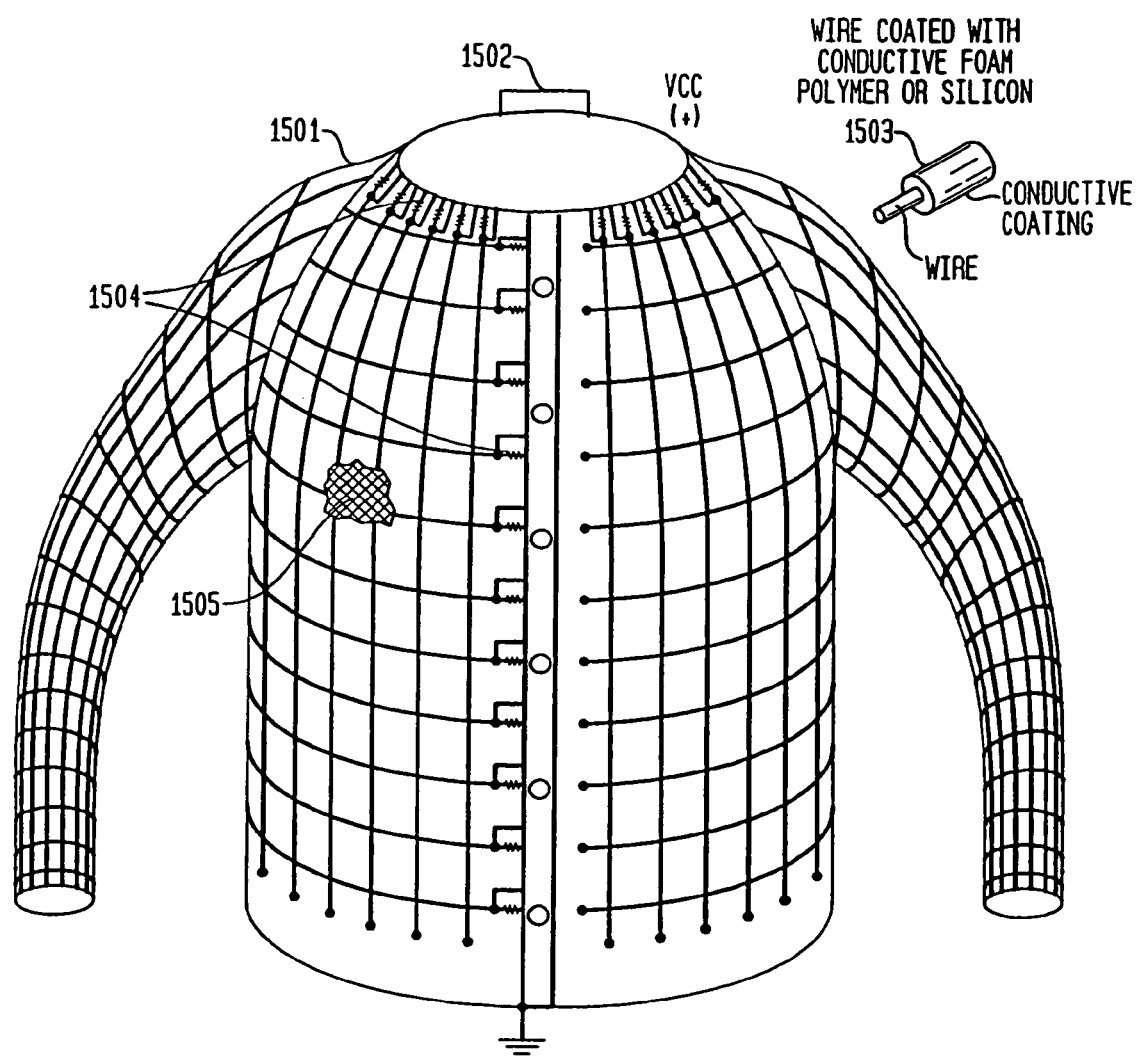
FIG. 15 is a hand sketch showing an embodiment of the shirt component of a sense suit.

Another embodiment of a method and apparatus to determine and retrieve positional information comprises creating a suit made out of pressure-sensitive material that would conduct current when put under pressure, for example, from a paintball, rubber T-balls, or Simunition® rubber bullet ammunition impact. FIG. 15 shows that by weaving pressure sensitive conductive fibers 1503 into the shirt 1501 and pants of paint ball participants and attaching a wireless transceiver with a Global Positioning System ("GPS") receiver 1502, one may create a suit that could be used to monitor players' activities during a simulated warfare scenario. The impact location 1505 can be determined from the current drawn in sense resistors 1504. One embodiment of the conductive fiber that can be used in the shirt/paints may be a thin wire coated with conductive foam, carbon impregnated rubber/silicon, or a conductive polymer called a sense wire 1503. The conductive coating's resistance would dramatically decrease with pressure. The lines traveling vertically would have a positive voltage applied and sense resistors on one end. The horizontal wires would be grounded with sense resistors at one end.

Another embodiment can have cloth spun out of conductive polymer such that resistance decreases with pressure, with conductive ink printed vertically on the outside and horizontally on the inside. When a paint ball hits the participant, the vertical wires would short out against the horizontal wires because the resistance of the cloth approximates near zero resistance when under pressure. This causes the sense resistor voltages to increase in both the horizontal and vertical wires due to increase in current flow. These voltages translate into X/Y coordinates and can be sent to the main computer via the wireless transceiver for processing. Another embodiment may simply use one layer of sense sheet or SST, for example, shown in FIG. 11, bonded to the cloth. Each transmitter, for example, using 802.11 wireless protocol or similar protocol, generates a unique identifier along with real-time GPS coordinates and hit location information. The unique identifier is associated with the person or player wearing it in the remote computer's database, so that the player's identification information can be retrieved during a training exercise.

In this embodiment, a remote computer can analyze the hit location information in real-time and determine the level of simulated injury (kill/non-kill). The computer can then send an automated response to the transceiver of the player illuminating his/her hit status LEDs, embedded in the lapel of their shirt, will notify each player as to whether he/she can continue to participate or needs to 'play dead'.

Figure 16:
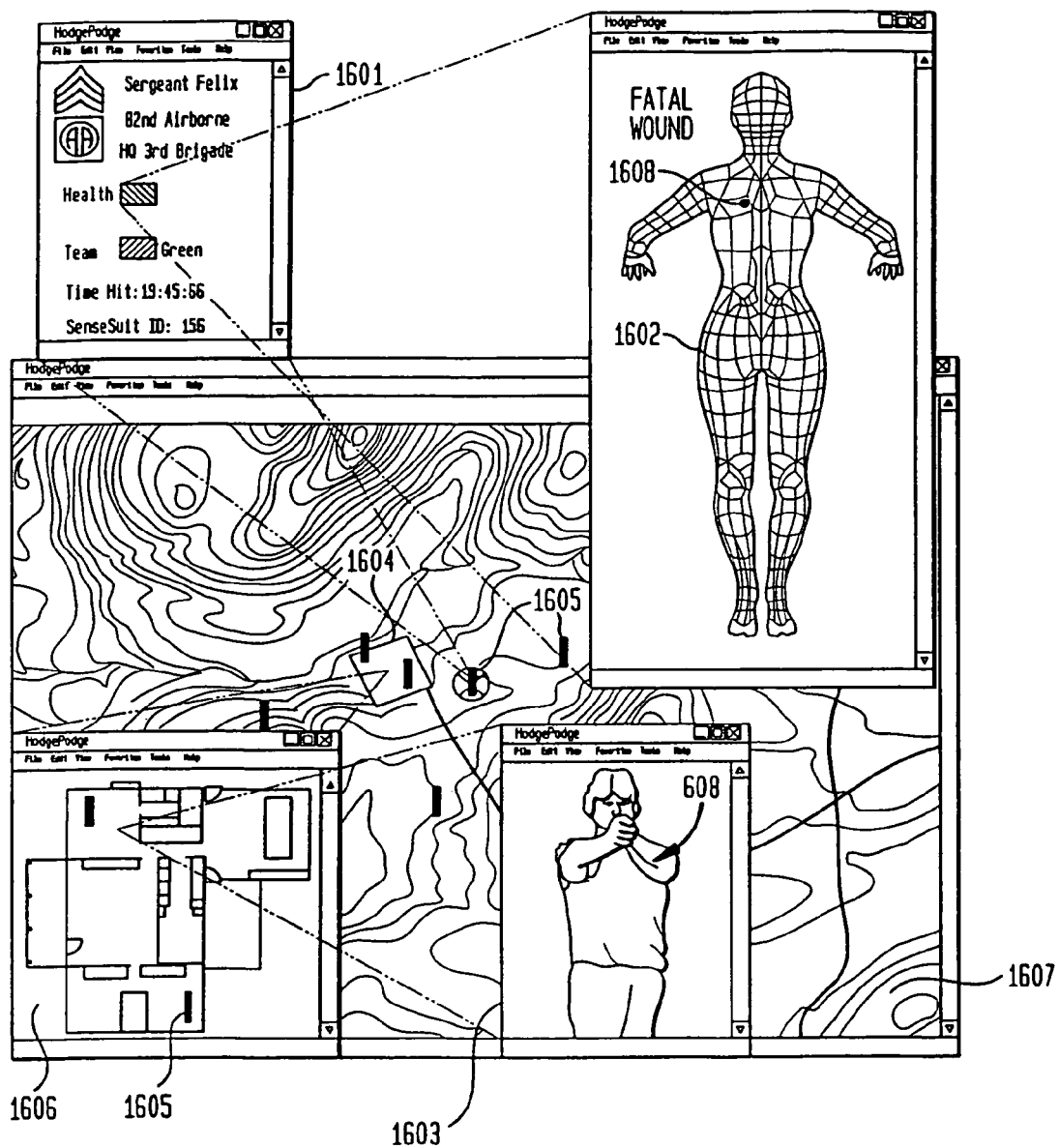
FIG. 16 is a screen shot showing an embodiment of a sense suit tracking apparatus.

FIG. 16 shows the sense suit tracking system topographical map 1607 which displays the movement and health of each player 1605 involved in a simulated urban assault scenario. Each player's team color is associated with his/her icon. Players that have an X superimposed over them are considered to be 'dead'. As the players move, their movements and any bullet impact locations 1608 are being recorded by a remote computer that is receiving the wireless data from each player's sense suit transmitter. The wireless data contains a unique id, the transmitters GPS latitude and longitude, and any (X/Y) hit location(s). While the urban assault scenario is engaged, the trainer could click on a player and get his/her information 1601 that is associated with the sense suite identification number. If that player had been tagged as hit, the trainer could click on the player's health icon and see a 3D computer model of the player's body showing all impact area(s) 1602. The trainer could also click on a shoot house 1604 and the shoot house floor plan 1606 would pop up showing all players and targets located inside. The trainer could then click on the targets 1603 within the shoot house and assess players' shooting patterns for each target hit.

When shooters hit targets and/or other players, the impact information could be stored with the shooters' recorded data on a remote computer for real-time scoring and selective playback. The scoring would be determined by line of fire trajectory path. Each player would have their kill score associated with their suit id which is also bonded to their personal identification information. In the case of police departments, after the scenario has been replayed for each shooter's edification, the recorded data could be sterilized by removing user's identification information. That way, the recorded scenario could still be used for training purposes and not leave any liability for any of the players involved. In this embodiment, the equipment used to track the sense suits is not limited to, but includes, 802.11 access points. The system can be portable and, therefore, the entire system could be easily deployed in a variety of simulated real-world situations and locations.

In another embodiment, the sense suit technology could be used to track the activity of soldiers in a live-fire situation. The sense suit's identification, GPS, and hit location data would be encrypted (using standard encryption techniques) and the pressure-sensitive hit material may be replaced with DDT or RMT technology. The tracking system allows for real-time coordination of forces in a live-fire scenario. Medics could be dispensed when a soldier was hit and his/her exact location would be known to expedite extraction from the battle field. In another embodiment, the transmission of data from each suit could be controlled by the tracking system's controller. The sense suit would remain dormant and would not transmit location/hit information unless requested by the system controller or possibly only when the suit has been penetrated. The sense suit could save soldiers' lives and help, for example, the military become more effective in coordinating overall operations.

Figure 17:
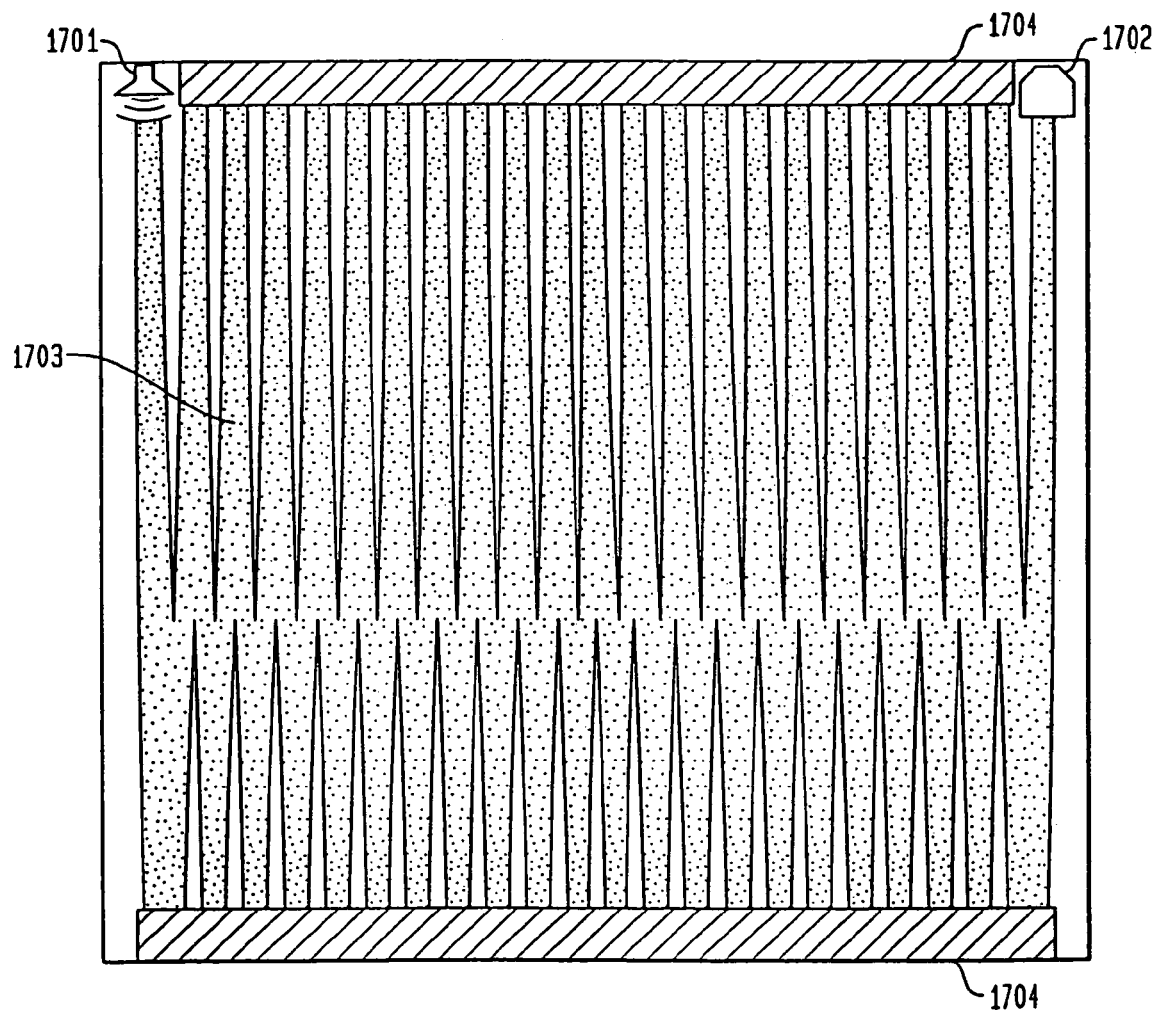
FIG. 17 is a diagram showing the laser plane path of a laser location tracking apparatus in one embodiment.
Figure 18:
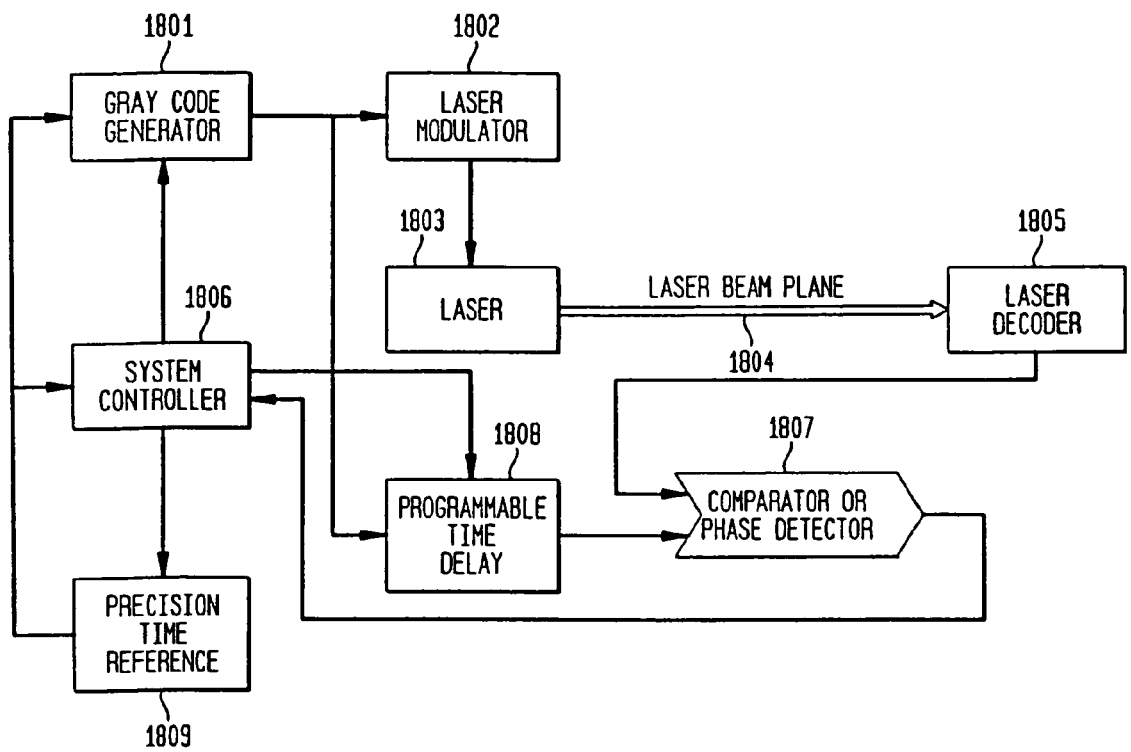
FIG. 18 is a block diagram depicting a circuit to reduce the data return from a laser plane apparatus in one embodiment.

FIG. 17 shows an embodiment of determining and retrieving positional information that uses one or more lasers 1701, mirrors 1704, and laser detectors 1702 to locate any projectile passing through the laser beam plane 1703. The beam may be modulated with an ultra high frequency stream of digital data. When the projectile passes though the laser plane, it will disturb the beam and, therefore, the data stream. That disturbance in the data stream can be detected using a comparator and the projectile's X/Y position can be calculated using a high resolution real-time clock. The diagram in FIG. 18 shows an embodiment of how a detection circuit works. The system controller 1806 signals both the gray code generator 1801 or digital counter and the precision time reference 1809 to start simultaneously. The time reference ensures that the gray code generator stays in synch. The gray code generator would feed the laser modulator 1802 and encode the digital data into a modulated laser beam by the laser 1803. With the beam tilted slightly (less than 5 degrees) the beam would bounce off of the mirrored surfaces creating a laser plane 1804 (as shown in FIG. 17—1703) until it reaches the laser detector 1805. The original gray code signal would pass through a time delay circuit 1808 to synchronize with the data stream coming out of the laser detector. Both the time delayed gray code and the laser detector decoded gray code would be passed to the comparator circuit or phase detection circuit 1807 for comparison. If there is a difference between the two data streams, the controller is notified and uses the time reference, along with the gray code count or the phase interference pattern, to determine where the beam was distributed in the space/time continuum. The controller then converts that information to X/Y coordinates and returns the coordinates back to the main computer for processing.

Another embodiment of the present application uses semi-reflective mirrored surface and places a discrete laser detector at each location where the beam bounces of the semi-reflective mirrored surface. Similar to what we discussed in FIG. 3 with the plurality of conductive lines, each laser beam has beams bouncing back and forth along a single plane line. To create an X/Y laser plane, two laser planes—one with the detectors along a horizontal plane and another along the vertical plane—are located right next to each other. The detectors would act as discrete row and column detectors, similar to what is achieved with the conductive lines in FIG. 3. Once a projectile breaks a beam in each plane, its X/Y location is detected immediately by the first stimulated X/Y laser detector closest to the laser source. Example applications of these embodiments are shooting ranges, indoor golf ranges, batting cages, other sporting equipment, and manufacturing.

If two or more of these X/Y laser planes are placed a short distance from each other, a three-dimensional vector of the projectile could be derived from comparing the X/Y penetration points through each X/Y laser plane. The magnitude of the vector could be calculated by tracking the time it takes the projectile to traverse through the space between each X/Y laser plane.

Figure 19:
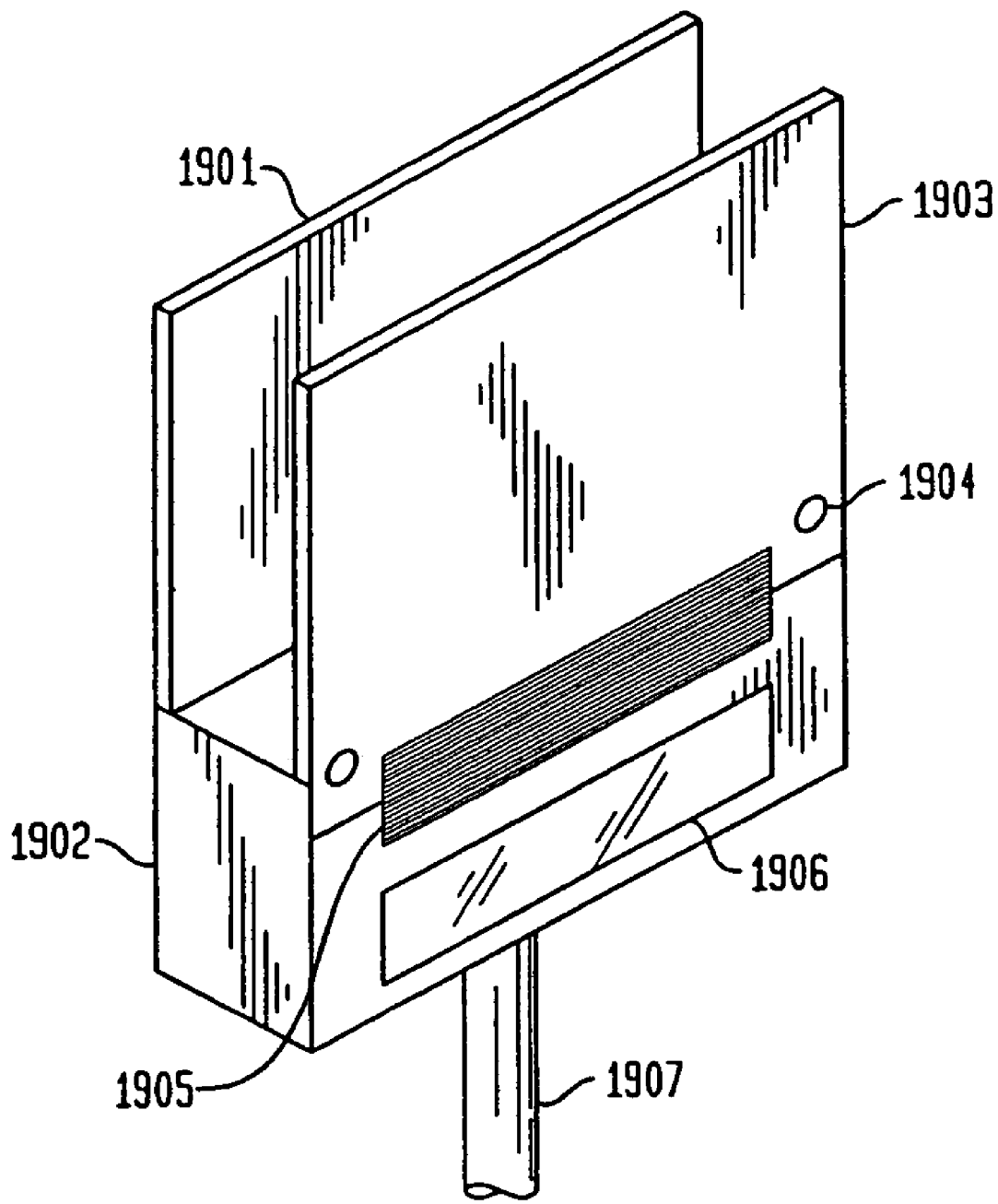
FIG. 19 is a hand sketch depicting a Real Time Sniper Locator (RTSL) in one embodiment.
Figure 20:
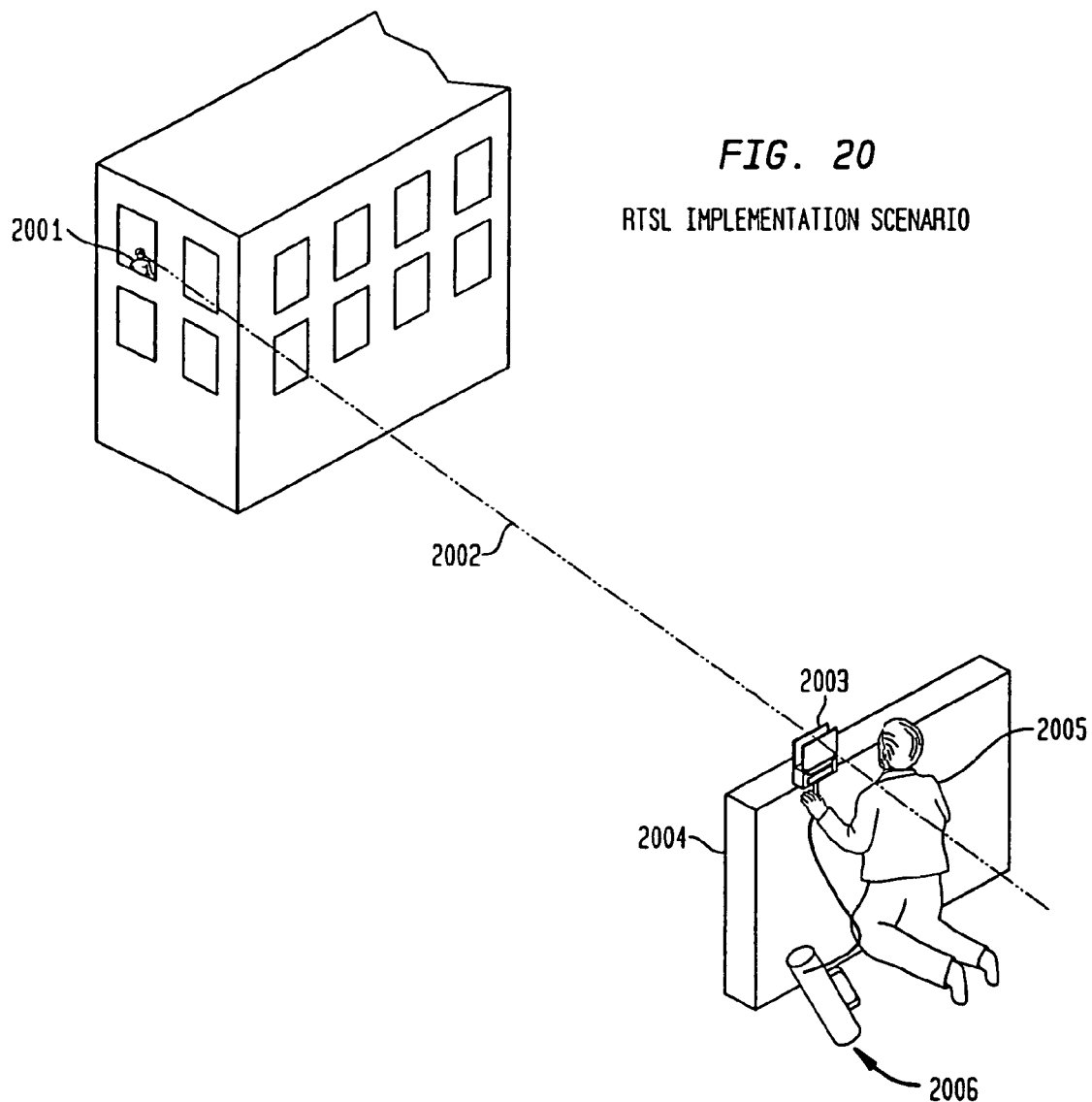
FIG. 20 is a hand sketch depicting how the RTSL is implemented in one embodiment.

In another embodiment, an apparatus and method are used to return the position of a sniper's location and may include a simple, hand-held acquisition system called a Real-Time Sniper Locator (RTSL). In one embodiment, the RTSL contains a DDT planar sheet or plate on each side 1901-1903 of the hand-held unit shown in FIG. 19. These disposable sensor plates, in one embodiment, use DDT technology to locate the penetration point and have a sensing circuit shown in FIG. 3. The apparatus and method in this embodiment may be used to acquire the 3D direction vector and distance range of the sniper The RTSL electronics compartment 1902 may contain the electronics necessary to properly locate the sniper. In this embodiment, it may include a gyroscope, a compass, a GPS tracking device, an altimeter, a temperature sensor, a high-speed counter, and communication devices to control both the display 1906 and transmit the sniper location data to a rocket propelled side arm weapon as shown in FIG. 20, 2006. When a bullet penetrates the first plate 1901, its X/Y penetration location is recorded and a high-speed counter is started. When that same bullet penetrates the second plate 1903, its X/Y penetration location is recorded and the time clock is stopped and recorded.

Figure 21:
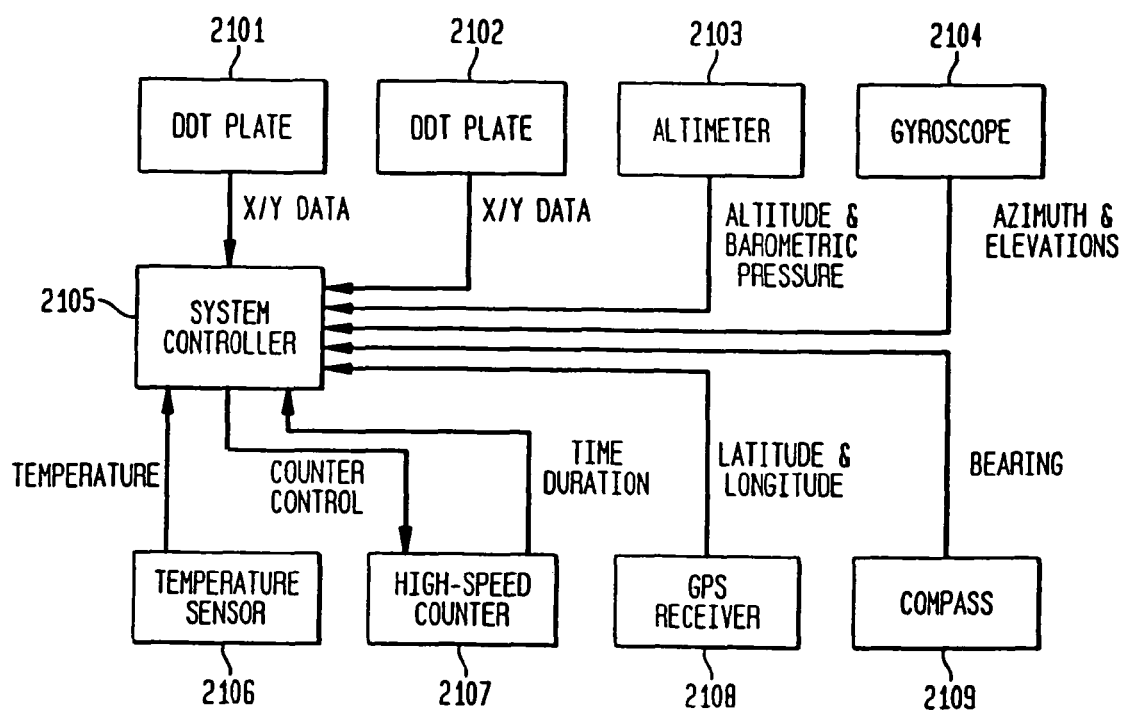
FIG. 21 is a block diagram of components used in a RTSL to determine the positional location of a sniper in one embodiment.

FIG. 21 shows a RTSL block diagram and the data returned to the system controller 2105 for analysis in one embodiment. The 3D direction vector is calculated from the entry 2101 (X/Y) and exit (X/Y) points 2102 of the DDT plates. The system controller calculates the 3D vector's magnitude by using bullet velocity calculations derived from the time duration data sent by the High-Speed Counter 2107, the altitude and barometric pressure reading from the Altimeter 2103, and the temperature reading from the temperature sensor 2106.

The calculated velocity is compared to a lookup table of known muzzle velocities and the distance of magnitude of the 3D vector is derived. Next, the 3D vector information, along with the azimuth and elevation data from the gyroscope 2104, latitude/longitude data from the GPS receiver 2108, and bearing data from the compass 2109, are used to properly orientate the 3D vector on Earth. The resultant 3D vector will exactly pinpoint the location of the sniper. In this embodiment, the RTSL also has guide posts 1904 to properly align the plates with the pickup contacts located under the spring-loaded clamp 1905. The handle 1907 is used to properly orientate the plates in reference to the sniper as shown in FIG. 20, 2001 and to supply an access point for cabling in the programmable rocket propelled side arm weapon 2006.

Another embodiment could use wireless medium to communicate with such devices or the soldier 2005 could simply read the coordinates of the display 1906 and call in the location to exterior support units. The soldier would stay out of harm's way behind a protective structure 2004 and hold the RTSL, with a silhouette painted on the face of the plate closest to the sniper up over the protective structure, and wait for the sniper to hit it as shown in FIG. 2, 203. Once hit by the sniper bullet 2002, the system would, for example, instantly provide the coordinates as to where the sniper is located and appropriate action could be immediately taken.

In another embodiment, more than one of these systems may be used for a single sniper and gain added accuracy in determining the sniper's location using triangulation technology, for example, by allowing each RTSL to share data with other RTSLs in the nearby vicinity. This data could be also uploaded to command centers for possible air strikes and the like.

In another embodiment, a servo-controlled infrared laser could be housed on the side of the unit, outside of the electronic compartment, and used to illuminate the sniper for a smart bomb or smart rocket hit. Once the RTSL was hit and the sniper's location determined, the soldier could turn the unit on its side, allowing only the laser to be exposed, and thereby minimizing the chance of the sniper fire taking out the electronics housed inside the electronic compartment. By making the servo-controlled laser a plug in module, a replacement could easily be done in the field to minimize down-time. A fixed laser could be used and the display panel could guide the soldier, based on the resultant 3D vector, where the shot originated from and while he holds the RTSL, locked on the sniper coordinates, another soldier could fire a laser guided missile at the illuminated target.

In another embodiment, if the sniper's location is accurate enough using RTSL technology, RTSL could be mounted right on a soldier's gun and he or she could dynamically reposition his or her sight as they move their gun, pinpointing the sniper in real-time for return fire. This dynamic system would literally move the cross hairs on the gun, guiding the shooter to the intended target. Using wireless technology, a sharp shooter gun sight may be controlled remotely by allowing the decoy using RTSL to locate the sniper and a remote shooter to return fire.

The system and method of the present disclosure may be implemented and run on a general-purpose computer. The embodiments described above are illustrative examples and it should not be construed that the present application is limited to these particular embodiments. Thus, various changes and modifications may be affected by one skilled in the art, without departing from the spirit or scope of the invention as defined in the appended claims.

Additional embodiments may additionally be included. In an exemplary embodiment, the methods and apparatuses of the present application may relate to SenseSuit technology, as disclosed in U.S. patent application Ser. No. 11/054,670, filed Feb. 9, 2005, entitled METHOD AND APPARATUS FOR DETERMINING AND RETRIEVING POSITIONAL INFORMATION, which is incorporated herein by reference, and RMT matrix pattern, disclosed in U.S. Pat. No. 5,516,113, which is also incorporated herein by reference. The SenseSuit technology may be enhanced by the addition of a dead reckoning system composed of a gyro, a compass, a barometer and accelerometers, which may be used to generate a player's latitude and longitude ("Lat/Long") information, and elevation position when a GPS signal is lost.

The dead reckoning system may include many types of technologies. For example, an ultrasonic or infrared distance device coupled with a compass may be mounted on the helmet of the SenseSuit. This sensor may measure a room as a player enters room and looks around. A map of a room area may be stored as a computer model on an onboard computer device, thereby creating a mathematical representation of the area encompassed by the room. As the player enters a room or hallway, the area may be mapped by the dead reckoning system creating a virtual map of each room and track the distance the person has traveled into the already mapped room or hallway. This distance may be added to the last GPS Lat/Long position prior to losing signal and be converted to absolute Lat/Long position. The compass and distance sensor would track the person as they leave and/or re-enter an already mapped room, thereby mapping the building as they traverse through it. The dead reckoning system may also map the location of the player to a building floor plan using points of recognition along the way with the distance sensor and compass to determine the player's position. Their distance may be added to the last known Lat/Long position, generating a new absolute Lat/long position. For example, if the person enters a building whose mathematical representation of a floor plan has been uploaded to the onboard computer, the distance information along with doorway locations may be used as points of reference. These doorways may be used to fix the player's position to the floor plan. Using the distance/compass sensor in combination with the floor map, an approximate position of the player may be determined using those points of reference.

In an additional exemplary embodiment, the SenseSuit technology could be further enhanced by adding an onboard computing device like a personal digital assistant ("PDA"), microcomputer with storage, or a laptop that could be used to retrieve and store data generated by GPS or dead reckoning system. The Lat/Long position generated by the GPS or dead reckoning system and the impact positional location circuitry may be stored by the onboard computing device. This device may have its data downloaded after an operation is completed or act as a buffer and/or transmitter sending data via a wireless media like 802.11, Code Division Multiple Access ("CDMA"), Global System for Mobile Communications ("GSM"), and the like. If, for example, the 802.11 connection were lost the computing device may automatically dial a modem connection via cell phone connectivity (GSM or CDMA) and continue to send the data and resynchronize back to real-time. Data collected by the onboard computer may be time-stamped so that the actual timing of each player may be synchronized with each other. Using atomic time clock time may be a source and synchronizing mechanism. Any data that were lost during that time may be buffered and resent once a new connection was established. All these devices may be hard wired with connectors or may use Bluetooth® wireless connectivity to talk to the onboard computing device.

In another exemplary embodiment, battery-operated 802.11 repeaters may be dropped in route while the players enter a building, supplying a contiguous communication link as the players move further into the building. The main control station may inform the player when to drop a repeater based on their location relative to the main control station or a previously dropped 802.11 repeater ensuring that the distance is within proper operating distances. The main control station may use the 802.11 signal strength as a criteria of when to drop a new repeater.

In an exemplary embodiment, a training grenade or training booby trap may be constructed out of a GPS or dead reckoning system augmented with a small explosive charge. The explosive charge may detonate and the main tracking system may use the GPS location of the training grenade or booby trap at the time it detonated to determine the radius of effected area. Each player in the effected area would be assessed for the level of lethality and may have their life status indicators updated accordingly. For example, if the main tracking system determined a player were standing within a predetermined distance of the training grenade when it detonated, the player may be considered killed for training purposes. The predetermined distance may be any suitable distance, such as 10 feet for instance. Another embodiment may include an audio buzzer or simulated audio explosion instead of an actual charge. Another embodiment may include a training grenade constructed from a rubber cylinder with stress lines formed in the rubber and a small explosive charge inside. This training grenade may generate a grenade pattern of flying rubber similar to a real, non-training grenade, but would not be lethal. The impact of the rubber pieces may trigger the SenseSuit indicating to the player their current life status. This type of technology may also be applied to training claymore mines as well as other types of training land mines, and even training projectiles such as training tow missiles. A universal device may be created that would allow the player to program a type of weapon to simulate on the fly and its lethality radius may be set accordingly.

The SenseSuit may also be further enhanced by adding an impact sensitive helmet. For training this helmet may be hard wired with a connector or use Bluetooth® technology to talk with the SenseSuit and may, using a pressure sensitive membrane, detect rubber bullet impacts on the outside of the helmet. For live fire the penetration membrane may be on the inside of the helmet. A live feed camera may be placed on the helmet to record the player's view of the operation and the video feed may be stored on the onboard computing device and/or transmitted back to the trainers tracking system.

Figure 22:
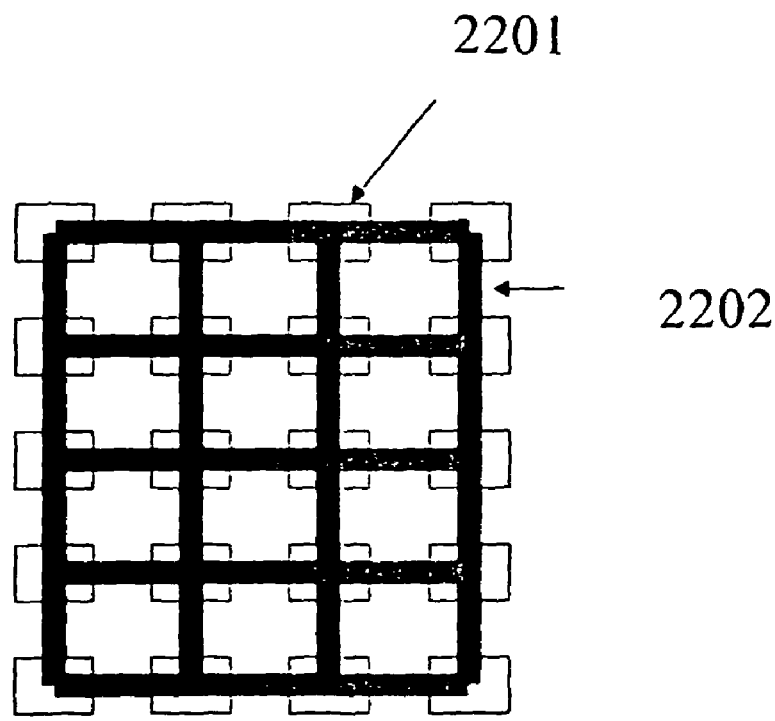
FIG. 22 is a diagram illustrating an exemplary matrix of conductive and resistive colloidal suspension coating according to an exemplary embodiment of the application.

RMT technology may be further enhanced by adding purely conductive square pads placed at each intersection, formed from a purely conductive colloidal suspension coating. In various alternative exemplary embodiments, shapes other than square pads may be utilized. FIG. 22 shows exemplary purely conductive intersections 2201 with the resistive interconnecting segments 2202. By adding the purely conductive intersections, the resistive segments may be more closely controlled because the segment length may be more accurately defined. This combination of purely conductive and resistive colloidal suspension coating may more accurately approximate discrete resistors soldered into a matrix configuration. It may also improve measurement techniques for measuring node to node resistance.

In an additional exemplary embodiment, shoot house walls could be instrumented with RMT or SenseSheet technology to locate stray bullets within the shoot house. When, for example, a player misses a target the walls may absorb the impact of the bullet and its X-Y position could thereby be displayed on the trainer's main tracking system. Flat targets or mannequins like the "3D mannequin Mike" could use RMT or SenseSheet technology to locate the X-Y position of bullet impacts from players performing the training operation both inside and outside the shoot house. The RMT or SenseSheet targets may use wireless media transport systems to transmit the data back to central control and may be placed though out the shoot house. A small solenoid may be used in the mannequins to cause them to fall down only when taking what the tracking system or onboard computer considers a lethal or crippling hit. This would add a significant amount of realism to the automated manikins. The live feed cameras on the SenseSuit helmets may show the view of the player as they participate in the training operation inside the shoot house.

A light sensitive SenseSheet may be created by forming a matrix grid as shown in FIGS. 11 & 12 of METHOD AND APPARATUS FOR DETERMINING AND RETRIEVING POSITIONAL INFORMATION, U.S. patent application Ser. No. 11/054,670, or using RMT matrix pattern. Each SenseSheet intersection would be filled with a light sensitive material such as a photoresistive polycrystalline thin film or a photoresistive amorphous thin film. When a laser beam excites the intersection, current will flow between the row and column sense resistors generating its X-Y location in the sensing circuit. In another embodiment, using thin film technology a photo diode could be formed at each intersection and would conduct current when hit with a laser beam thereby generating X-Y location. Using RMT technology each intersection would contain a purely conductive colloidal suspension coated square and each resistive segment leaving each conductive square would be formed from a colloidal suspension coating of photoresistive material. Using a thermoresistive thin film compound at each intersection, a temperature sensitive SenseSheet may be formed. This thermally-sensitive SenseSheet may be very useful in determining the rate and pattern of distribution of thermal energy of a unit under test. It may also be used inside a fireman's suit to show a commander how much heat any fireman is being submitted to. The thermal SenseSuit may indicate exactly where the fireman is and where on their body, X-Y location, they are being exposed and to what degree of intensity.

By using magnetoresistive thin film compound at each intersection, a magnetically sensitive SenseSheet may be formed and magnetic distributions can be measured across a plane. Each intersection may be used to measure both polarity and intensity of the magnetic force being applied at each intersection. It may be used as a magnetic sensor that could display magnetic patterns formed by different types of electromagnetic devices.

The RMT, light sensitive SenseSheet, thermoresistive SenseSheet, pressure sensitive SenseSheet and magnetoresistive SenseSheet may be combined in any suitable combinations to form multifunctional SenseSheet hybrids. Where, for example, in one embodiment, both the light sensitive technology and the pressure sensitive SenseSheet technology may be combined into a dual purpose SenseSuit that has both laser detection and rubber bullet impact detection. This combination may be done by either applying both the light sensitive and pressure sensitive material to each X-Y intersection in a single SenseSheet or by laminating both the light sensitive SenseSheet and the pressure sensitive SenseSheet together.

Physiological parameters such as body temperature, heart rate, and blood pressure may be added to the SenseSuit. These parameters may give the trainer a better idea of what the player is feeling when performing the training operation.

Electroshock pads may be added to the SenseSuit to give a player a small jolt when they are hit by a rubber bullet. Or the system could use a light sensitive SenseSheet and a laser gun to activate the pads. The pads could also be placed in the pants on the leg muscles and give a small shock when hit in the leg by a laser gun. By using multiple layers of RMT technology spaced apart from each other a projectile trajectory path can be calculated. This may be useful in determining the trajectory path of a projectile in 3D. By layering multiple RMT layers interlaced with a semi rigid substrate like cardboard, plastic, or chipboard a target could be construed that would allow for the analysis of projectile penetration and sprawling patterns in 3 dimensions. As the projectile penetrates and fragments each fragment trajectory path could be time stamped and mapped by locating its penetration X-Y location in each layer of RMT as they travel through the composite target.

Figure 23:
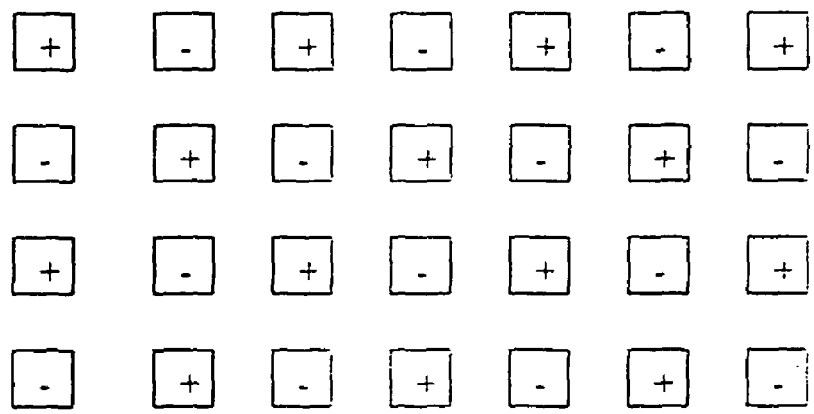
FIG. 23 is a diagram illustrating an exemplary matrix of nodes according to an exemplary embodiment of the application.

In another embodiment the pressure sensitive SenseSheet membrane could be used as a backdrop for a projector. The projector may project targets onto the backdrop and when a player shot at the target with an AirSoft® rubber pellet gun or a paintball gun with solid rubber balls the impact X-Y location may be determined by the pressure sensitive membrane. This X-Y impact data may be sent to the computer that is displaying target image via the projector and the players score may be immediately updated. The target could even be a scenario where the player may have to respond to a simulated threat and their shots would be evaluated based on the X-Y location determined by the pressure sensitive SenseSheet. The backdrop membrane could be formed onto a retractable roll that could be pulled out when needed. This membrane could also be used for entertainment arcades as a simulated shooting gallery or golf course and may respond when hit by a golf ball, for instance. The membrane may also be used in a batting cage to simulate a ball in play. In another embodiment, the pressure sensitive membrane may be formed into rigid panels that could be assembled into a projector screen. Each adjacent panel, for example, may electrically interconnect both the rows and columns. These panels could be used to assemble various sizes of projector screens and would tie into the computer that is projecting the images using a sensing circuit as shown in FIG. 12 of METHOD AND APPARATUS FOR DETERMINING AND RETRIEVING POSITIONAL INFORMATION, U.S. patent application Ser. No. 11/054,670. The light sensitive SenseSheet could be used in substantially similar, or equivalent, configurations or embodiments as the pressure sensitive SenseSheet, but may require stimulation by a laser light instead of an impact. In an exemplary embodiment, a large foam-rubber mannequin, such as a Redman® dummy, may be used to improve an officers striking capability. Pressure-sensitive SenseSheet technology, either adhered to the surface of the dummy or placed underneath the surface of the dummy, could be used to measure impact power absorbed by the dummy when hit. By attaching a computer to the pressure sensitive SenseSheet the power level and distribution could be displayed along with the calculated total amount of energy absorbed. This may be used as a criteria of whether a hit was effective or not. In another embodiment the torso and appendages, for instance of a dummy, could be constructed of hard cardboard tubes with several sensors placed inside. These sensors may consist of a matrix of both positive and negative powered sense nodes. Each sense node would have a sense resistor tied to it and the respective positive or negative supply voltage as well as a sense wire that is sent back to the acquisition system. The acquisition system may include a bank of analog multiplexes and A/D converter similar to the RMT acquisition system. The matrix of nodes may follow an ordered pattern as show in FIG. 23. The foam rubber may have carbon embedded in it and may increase conductance as increased pressure is applied. The dummy's surfaces may then be calibrated to determine each impact area resistance and then store those resistance parameters in a computer. Each dummy would be serialized and its respective resistive parameters may be referenced by that serial number or barcode. Similar procedures may be performed with the RMT targets. A RMT target may be placed on a bed of nails tester and each individual node to node resistance may be measured and stored in a net list that is referenced by the RMT target serial number or barcode.

In alternative exemplary embodiments, a SenseSuit® training suit may be utilized to help soldiers and police officers assess proficiencies in a force-on-force training scenario. The suit may detect non-lethal impacts from devices such as paintball guns, AirSoft® pellet guns, Simuntion® (rubber bullets) ammunition, blunt knife strikes, baton strikes, etc. The suit may be designed to be light and accurate in locating points of impact.

Figure 24:
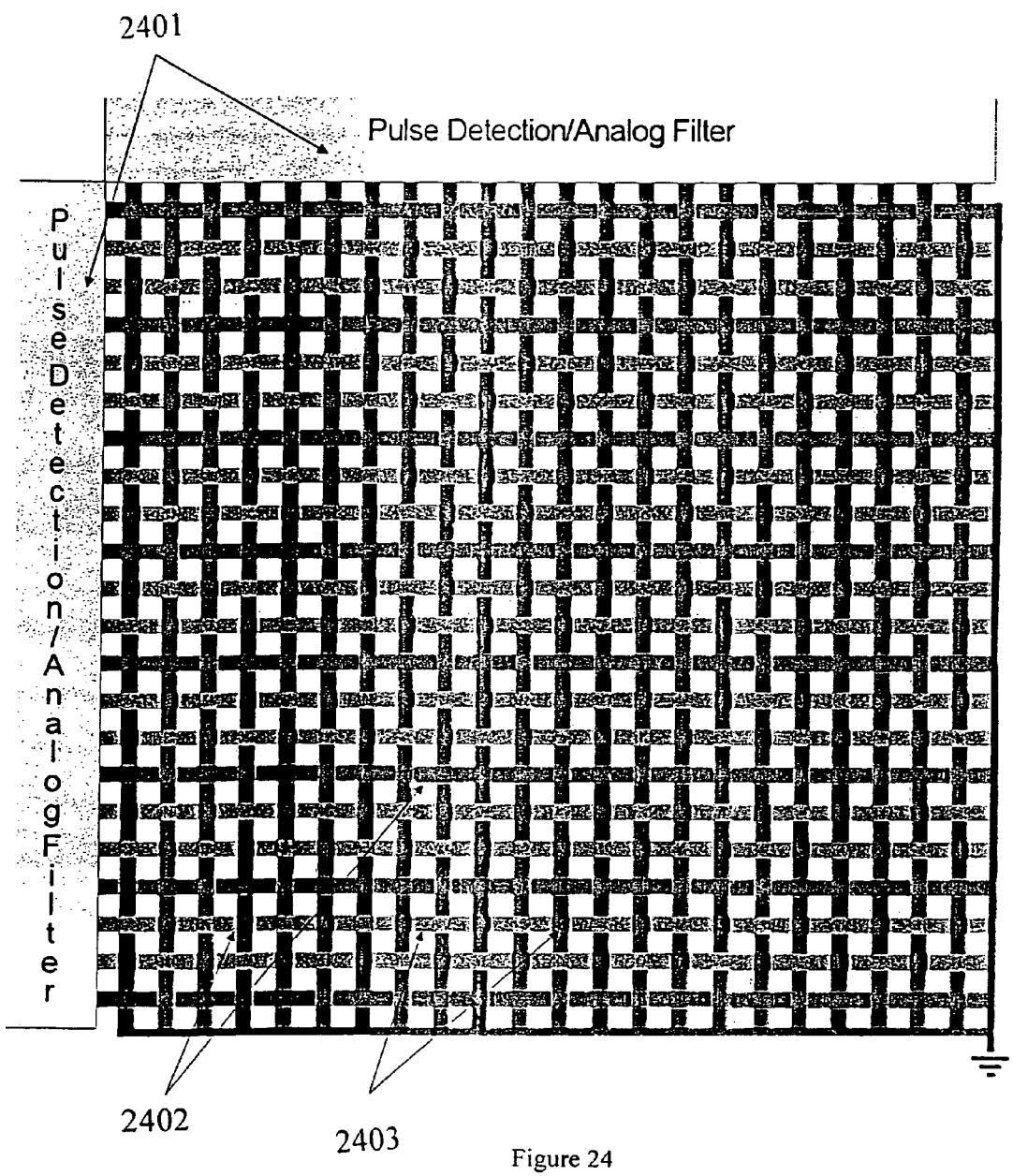
FIG. 24 is a diagram illustrating an exemplary pattern of thread location according to an exemplary embodiment of the application.

In an exemplary embodiment, a suspension of piezoelectric crystals either created using nanotechnology, synthesized in a lab, or found in nature could be added to conductive plastic and spun into a SenseThread. Polarized fluoropolymer, polyvinylidene fluoride ("PVDF"), or lead zirconate titanate ("PZT") which inherently has piezoelectric properties could also be added to conductive plastic and spun or extruded or used directly to make SenseThreads. The SenseThread may create a pulse of energy when impacted. Therefore, as shown in FIG. 24, by placing the SenseThread in both vertical and horizontal patterns 2402, the pulse detection/analog filter circuitry 2401 may locate the impact location by row and column intersection. This piezoelectric-impregnated conductive plastic could also be coated or extruded over a thin conductive wire to produce the same response. The piezoelectric-impregnated conductor may be polarized so that a voltage potential may be developed across both ends of the thread when hit by a force. This can be done by applying a potential difference across the SenseThread as it is setting forcing the piezoelectric crystals to correctly align or polarize before being locked into place once set. The SenseThread may include a flexible and/or semi-flexible plastic to allow the SenseThread to be easily worn as a garment. There are other techniques that may accomplish the same results by one skilled in the art, without departing from the spirit or scope of the invention.

In an exemplary embodiment, the SenseThread may be formed into a fabric and/or a fabric-type material, and may be formed into a garment to be worn by an individual. Alternatively, the SenseThread may be formed into an element that may be attached to a garment worn by an individual, such as clothing or protective garments.

The SenseThreads could be placed at different thread counts to create a defined pattern of resolution. For example as shown in FIG. 24, the SenseThread is placed after 2 threads of non-conducting material (Cotton, nylon, polyester, etc) 2403 are weaved in. The resolution of the grid is therefore determined by the number of inert threads weaved between the SenseThreads. In this embodiment, the pulse-sensing circuit may be constructed out of digital analog voltage clamp to limit or filter the voltage to an acceptable level. The filter may then feed a digital latch that would latch the pulse and store it until the shift register would shift it out for processing. Other similar technologies known to one skilled in the art could be used to capture the pulse and process the information.

Figure 25:
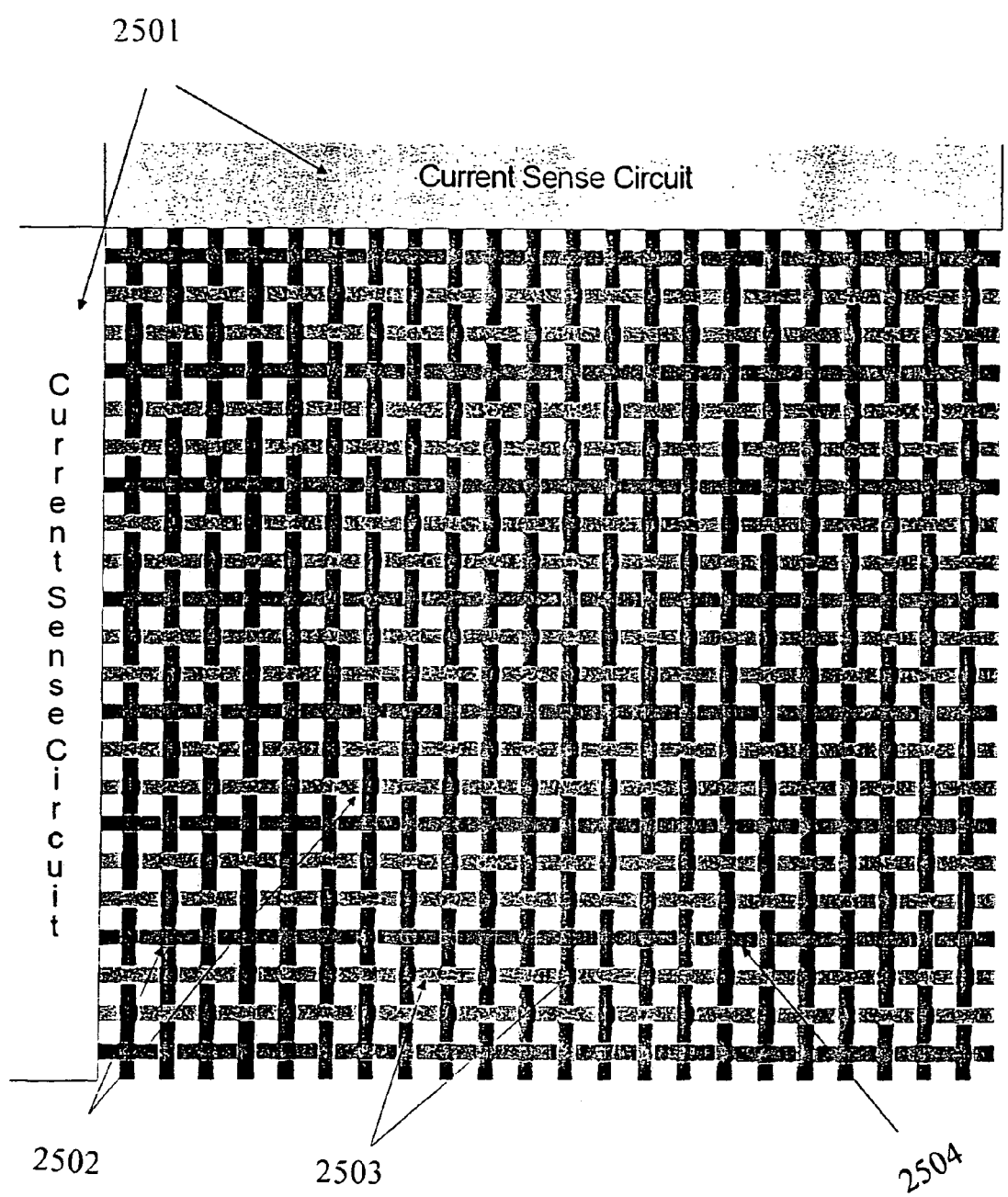
FIG. 25 is a diagram illustrating an exemplary pattern of thread location according to an exemplary embodiment of the application.
Figure 26:
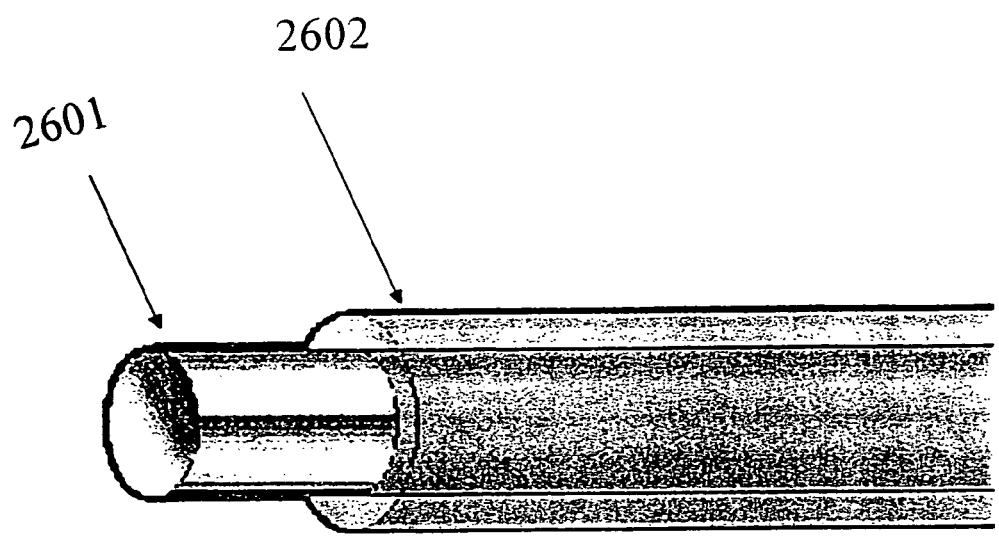
FIG. 26 is a diagram illustrating an exemplary coated conductive wire according to an exemplary embodiment of the application.

In another embodiment, as shown in FIG. 26, a carbon-impregnated silicon or carbon-impregnated neoprene rubber 2602 may be coated onto a conductive wire 2601 to create a SenseWire. By placing the SenseWire in both vertical and horizontal patterns 2502 as shown in FIG. 25, one may be able to locate the point of impact by sensing the current draw in both the horizontal and vertical SenseWire. Alternatively, the horizontal SenseWire may be a conductive wire and the vertical SenseWire may be coated with carbon impregnated pressure sensitive coating. The other end of the SenseWire that is not connected to the current sending circuit may be free floating or non-terminated. The SenseWires may be placed at different thread counts to create a defined pattern of resolution. For example, in FIG. 25 the SenseWire is placed after 2 threads of non-conducting material (Cotton, nylon, polyester, etc.) 2503 are weaved in. The resolution of the grid is determined by the number of inert threads weaved between the SenseThreads. A different voltage potential would be placed across the horizontal and vertical SenseWires. For example, the vertically woven SenseWires may be energized by a 5 volt potential and the horizontally-woven SenseWires may be held to ground potential. When a projectile hits at an intersection 2504 of both the horizontal and vertical SenseWire the silicon or neoprene rubber may go into compression, causing the impregnated carbon to condense and reduce its resistance creating a virtual short between the SenseWires. The current detection circuit 2501 may detect a current draw in both the horizontal and vertical SenseWires because of voltage potential across the horizontal and vertical SenseWire. That current draw may trigger a response in both the row and column of the SenseWires sensing circuit indicating directly the location of impact. Such a circuit and/or a suitable alternative embodiments may be readily obtainable by one skilled in the art.

Figure 27:
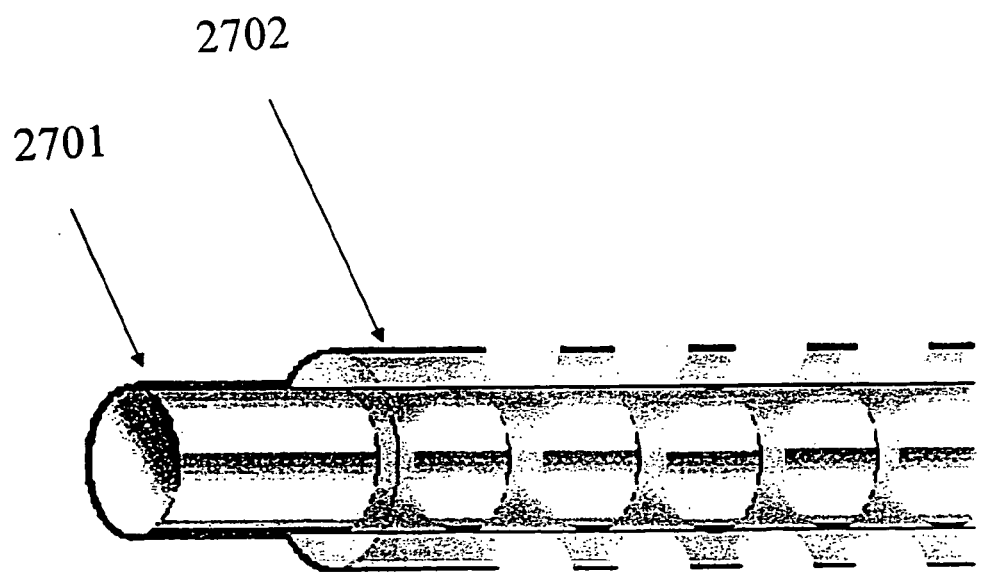
FIG. 27 is a diagram illustrating an alternative exemplary coated conductive wire according to an exemplary embodiment of the application.

Referring to FIG. 27, in another embodiment, a partial insulative coating 2702 could be formed around a wire 2701 causing the intersections to be isolated from each other. This insulative coating could be formed from silicon rubber. The silicon may isolate each vertical SenseWire from each horizontal SenseWire and only when hit would the silicon compress allowing both SenseWires to touch each other through the gaps in the insulation creating an electrical short. Alternatively, the horizontal SenseWire may be a conductive wire and the vertical SenseWire be coated with the partially insulative coating. The vertically woven SenseWires may be energized by a 5 volt potential and the horizontally woven SenseWires could be held to ground potential. The current detection circuit 2501 may detect a current draw in both of the SenseWires because of voltage potential across the horizontal and vertical SenseWires. That current draw would trigger a response in both the row and column of the SenseWires sensing circuit indicating directly the location of impact.

Figure 28:
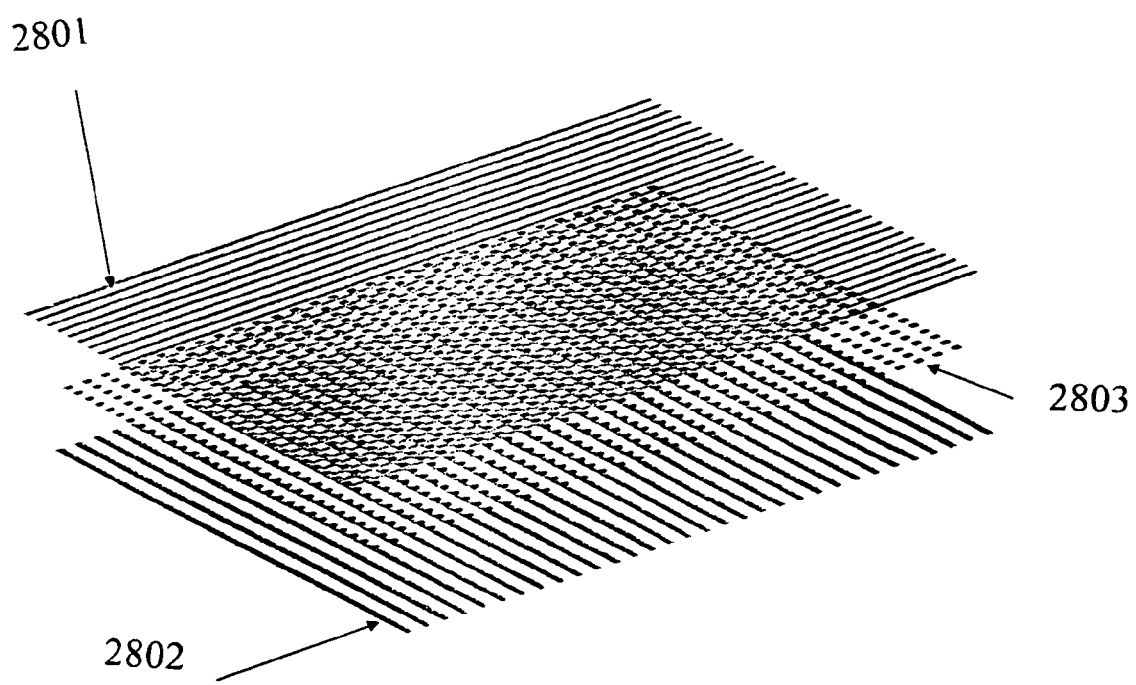
FIG. 28 is a diagram illustrating an exemplary SenseSheet formed of layers of ink bonded to plastic sheets according to an exemplary embodiment of the application.
Figure 29:
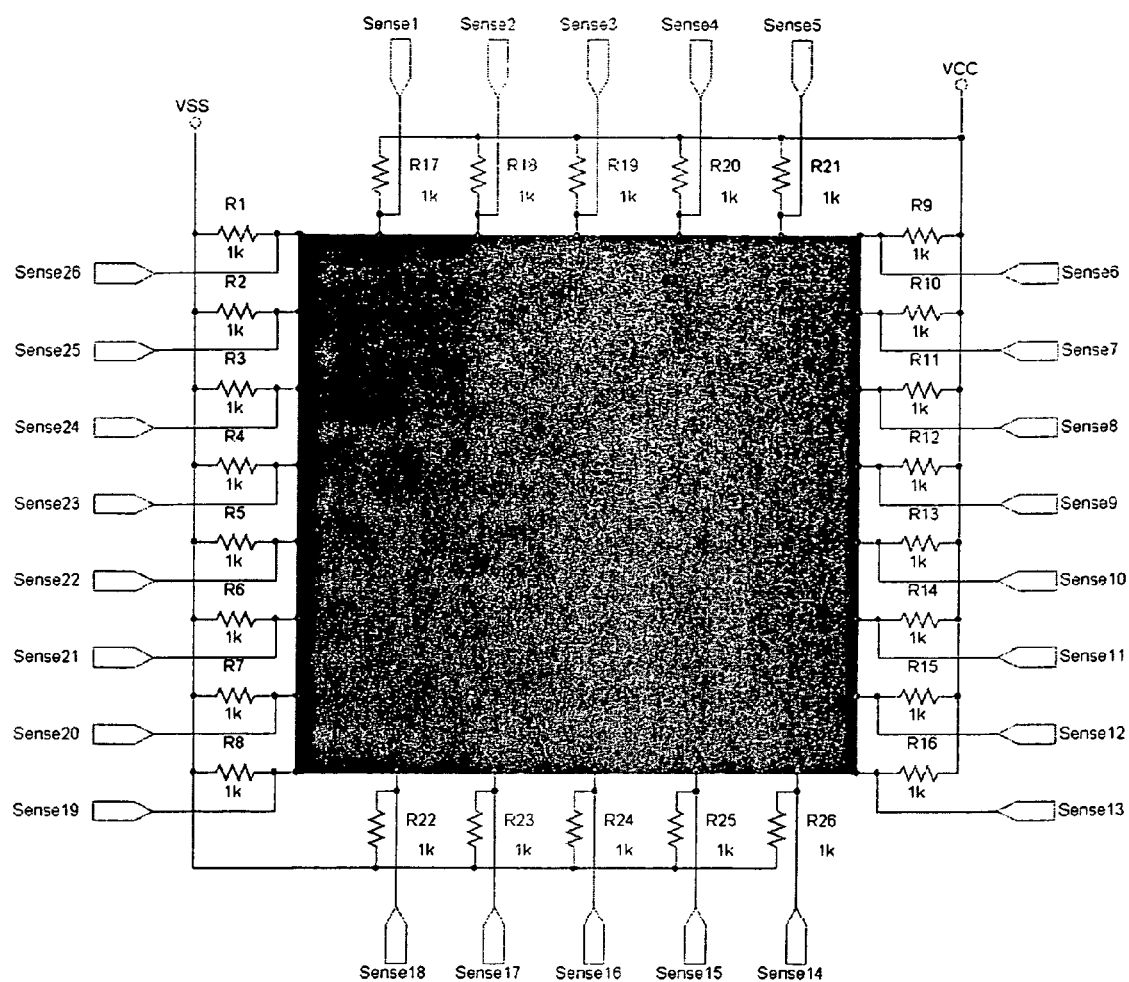
FIG. 29 is a diagram illustrating an exemplary conductive carbon surface having peripheral sense nodes attached thereto, according to an exemplary embodiment of the application.

In an alternative exemplary embodiment as shown in FIG. 28, a target or SenseSheet® constructed from two layers of conductive ink may be bonded to two plastic sheets. One sheet of plastic may have the conductive traces orientated horizontally 2801. The other sheet of plastic may have the conductive traces orientated vertically 2802. Both sheets may have the conductive ink facing each other and the piezoelectric doping 2803 may be applied at each intersection. The target is wired the same was as shown in FIG. 24. When the intersection is hit by a projectile the piezoelectric doping will generate and voltage potential that is detected by both the row and column pulse detection circuit 2401.

It is understood that all of the SenseWire and SenseThread implementations also apply to targets. Whether the targets are mannequins or flat targets, the same type of implementations are possible and are considered in the spirit or scope of the invention.

In an additional exemplary embodiment, a target may be constructed of conductive carbon paper or carbon-impregnated material. By placing sense nodes around the carbon paper and monitoring an amount of current being drawn at each node, a projectile or bullet penetration may be located using the RMT algorithm as previously described. Each sense wire may return a voltage proportional to the amount of current drawn across each respective 1k ohm sense resistor. Those voltages may in turn be converted to a digital value and sent back to the main computer for processing. As projectiles and/or bullets penetrate the carbon impregnated membrane they may cause currents to shift and/or change within the surface or along the perimeter. Those shifts in current may then be simulated by a mathematical model running on the acquisition system to determine the exact location of penetration as described in the RMT technology. Furthermore this embodiment may also benefit from the DDT in assisting the simulator in locating the target penetration as described in the RMT hybrid target.

I claim:

1. An apparatus for determining and retrieving positional information, comprising:
    a surface, the surface including a plurality of first elements and a plurality of second elements;
    at least one detection element connected to at least one of the plurality of first elements and the plurality of second elements; and
    wherein the plurality of first elements and the plurality of second elements comprise conductive threads, the conductive threads comprising piezoelectric crystals.

2. The apparatus of claim 1, wherein the at least one detection element includes a pulse detection element.

3. The apparatus of claim 1, wherein the at least one detection element includes a current sensing circuit.

4. The apparatus of claim 1, wherein the piezoelectric crystals are embedded within conductive plastic.

5. The apparatus of claim 4, wherein at least one of the plurality of first elements and the plurality of second elements further includes nonconductive threads.

6. The apparatus of claim 1, wherein the surface is one of formed into a garment suitable for wearing by an individual or attached to a garment worn by an individual.

7. The apparatus of claim 1, wherein the plurality of first elements is positioned at a substantially right angle with respect to the plurality of second elements.

8. An apparatus for determining and retrieving positional information, comprising:
    a surface having a matrix formed on at least one surface face thereof, the matrix including a plurality of parallel horizontal conductive elements and vertical conductive elements, the horizontal conductive elements and the vertical conductive elements overlapping at intersections; and
    a plurality of conductive pads, wherein
    at least one of the plurality of conductive pads is located at each intersection of the matrix; and
    each conductive pad of the plurality of conductive pads located at each intersection is in contact with one of the horizontal conductive elements and one of the vertical conductive elements overlapping at each respective intersection;
    each conductive pad allowing an electrical connection between one of the horizontal conductive elements and one of the vertical conductive elements.

9. The apparatus of claim 8, wherein each of the plurality of conductive pads includes a purely conductive colloidal suspension coating.

10. The apparatus of claim 8, wherein each of the plurality of conductive pads is formed in one of a substantially square or a substantially rectangular shape.

11. An apparatus for determining and retrieving positional information, comprising:
    a surface formed of thermally conductive material;
    a positive supply voltage element coupled to the surface;
    a negative supply voltage element coupled to the surface;
    a processor coupled to one or more sensing elements, the one or more sensing elements configured to sense one of a quantity of voltage or a quantity of current across the positive supply voltage element and the negative supply voltage element;
    the processor configured to determine an impact of a projectile with the surface based on the quantity of voltage or the quantity of current; and
    wherein the surface radiates a thermal image for night fire training in response to heat created by an electrical potential to create a target system which detects the impact of the projectile while radiating the thermal image.

12. The apparatus of claim 11, wherein the conductive material includes at least one of conductive carbon paper or conductive carbon impregnated material.

13. The apparatus of claim 11, wherein each of the one or more sensing elements is a current sensing element.

14. The apparatus of claim 11, wherein each of the one or more elements is a voltage sensing element.

15. The apparatus of claim 11, further comprising:
a matrix formed on at least one side of the surface, the matrix including a plurality of parallel horizontal and vertical conductive elements, the horizontal and vertical conductive elements overlapping at intersections.

16. The apparatus of claim 15, further comprising: a plurality of conductive pads, wherein at least one of the plurality of conductive pads is located at each intersection of the matrix; and
each conductive pad located at each intersection is in contact with one or both of the parallel horizontal and vertical conductive elements overlapping at each respective intersection.

17. An apparatus for determining and retrieving positional information, comprising:
a surface, the surface including a plurality of first elements and a plurality of second elements;
at least one detection element connected to at least one of the plurality of first elements and the plurality of second elements; and
wherein the plurality of first elements and the plurality of second elements include conductive threads, the conductive threads including at least one of polarized fluoropolymer, polyvinylidene fluoride, and lead zirconate titanate.

18. The apparatus of claim 17, wherein
the conductive threads are combined with conductive plastic.

19. The apparatus of claim 18, wherein at least one of the plurality of first elements and the plurality of second elements further includes nonconductive threads.

* * * * *

UNITED STATES PATENT AND TRADEMARK OFFICE
CERTIFICATE OF CORRECTION

| | | |
|---|---|---|
| PATENT NO. | : 7,862,045 B2 | Page 1 of 1 |
| APPLICATION NO. | : 11/402419 | |
| DATED | : January 4, 2011 | |
| INVENTOR(S) | : Bruce Hodge | |

It is certified that error appears in the above-identified patent and that said Letters Patent is hereby corrected as shown below:

TITLE PAGE,
Please amend the Related U.S. Application Data (60), to read as follows:

This application claims the benefit of U.S. Patent Application Serial No. 11/054,670, filed February 9, 2005, now U.S. Patent No. 7,207,566, which claims the benefit of provisional ~~Provisional~~ application No. 60/670,550, filed on Apr. 11, 2005, provisional application No. 60/760,750, filed on January 20, 2006.

Signed and Sealed this

Thirteenth Day of September, 2011

David J. Kappos
*Director of the United States Patent and Trademark Office*

UNITED STATES PATENT AND TRADEMARK OFFICE
CERTIFICATE OF CORRECTION

PATENT NO. : 7,862,045 B2  
APPLICATION NO. : 11/402419  
DATED : January 4, 2011  
INVENTOR(S) : Bruce Hodge Page 1 of 1

It is certified that error appears in the above-identified patent and that said Letters Patent is hereby corrected as shown below:

Title Page:

In the Related U.S. Application Data (60):

Delete: "This application claims the benefit of U.S. Patent Application 11/054,670, filed February 9, 2005, now U.S. Pat No. 7,207,566, which claims the benefit of U.S. provisional application No. 60/670,550, filed Apr. 11, 2005, provisional application No. 60/760,750, filed on Jan. 20, 2006"

Insert -- This application claims the benefit of U.S. provisional application No. 60/670,550, filed Apr. 11, 2005, which claims the benefit of U.S. Provisional Application No. 60/760,750, filed on January 20, 2006. This application also claims the benefit of U.S. Patent Application 11/054,670, filed February 9, 2005, now U.S. Pat. No. 7,207,566, which claims the benefit of U.S. Provisional Application No. 60/543,342, filed February 10, 2004, which claims the benefit of U.S. Provisional Application No. 60/636,379, filed December 16, 2004. --

Signed and Sealed this  
Twenty-sixth Day of June, 2012

David J. Kappos  
*Director of the United States Patent and Trademark Office*

UNITED STATES PATENT AND TRADEMARK OFFICE
CERTIFICATE OF CORRECTION

PATENT NO. : 7,862,045 B2  Page 1 of 1
APPLICATION NO. : 11/402419
DATED : January 4, 2011
INVENTOR(S) : Bruce Hodge It is certified that error appears in the above-identified patent and that said Letters Patent is hereby corrected as shown below:

Title Page:

In the Related U.S. Application Data (60):

Delete: "This application claims the benefit of U.S. provisional application No. 60/670,550, filed Apr. 11, 2005, which claims the benefit of U.S. Provisional Application No. 60/760,750, filed on January 20, 2006. This application also claims the benefit of U.S. Patent Application 11/054,670, filed February 9, 2005, now U.S. Pat No. 7,207,566, which claims the benefit of U.S. Provisional Application No. 60 543,342, filed February 10, 2004, which claims the benefit of U.S. Provisional Application No. 60,636,379, filed December 16, 2004."

Insert: -- This application claims the benefit of U.S. provisional application No. 60/670,550, filed April 11, 2005 and claims the benefit of U.S. Provisional Application No. 60/760,750, filed January 20, 2006. This application is also a Continuation-in-Part of U.S. Serial No. 11/054,670, filed February 9, 2005, and issued as U.S. Patent No. 7,207,566 on April 24, 2007, which claims priority to U.S. Provisional Application No. 60/543,342 filed February 10, 2004 and U.S. Provisional Application No. 60/636,479 filed December 16, 2004. --

Signed and Sealed this
Twenty-third Day of September, 2014

Michelle K. Lee
*Deputy Director of the United States Patent and Trademark Office*